United States Patent
Zaffarano et al.

(10) Patent No.: US 10,270,798 B2
(45) Date of Patent: Apr. 23, 2019

(54) ASSESSING EFFECTIVENESS OF CYBERSECURITY TECHNOLOGIES

(71) Applicant: Siege Technologies LLC, Manchester, NH (US)

(72) Inventors: Kara Zaffarano, Rome, NY (US); Joshua Taylor, Rome, NY (US); Samuel Hamilton, Falls Church, VA (US)

(73) Assignee: SIEGE TECHNOLOGIES LLC, Manchester, NH (US)

( * ) Notice: Subject to any disclaimer, the term of this patent is extended or adjusted under 35 U.S.C. 154(b) by 144 days.

(21) Appl. No.: 15/286,990

(22) Filed: Oct. 6, 2016

(65) Prior Publication Data

US 2017/0104780 A1  Apr. 13, 2017

Related U.S. Application Data

(60) Provisional application No. 62/374,953, filed on Aug. 15, 2016, provisional application No. 62/238,974, filed on Oct. 8, 2015.

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,535,227 B1 | 3/2003 | Fox | |
| 8,494,955 B2 | 7/2013 | Quarterman | |
| 8,856,863 B2 * | 10/2014 | Lang | G06F 21/57 713/152 |

(Continued)

FOREIGN PATENT DOCUMENTS

| | | | | |
|---|---|---|---|---|
| WO | WO 2009/152282 A1 * | 12/2009 | | G06F 11/00 |
| WO | 2014066500 A1 | 5/2014 | | |
| WO | WO 2014/066500 A1 * | 5/2014 | | H04L 29/06 |

OTHER PUBLICATIONS

International Search Report and Written Opinion Issued in PCT Application No. PCT/US2016/055670, dated Jun. 26, 2017, 14 Pages.

(Continued)

*Primary Examiner* — Christopher A Revak
(74) *Attorney, Agent, or Firm* — Perkins Coie LLP

(57) ABSTRACT

A method for assessing effectiveness of one or more cybersecurity technologies in a computer network includes testing each of two or more component stages of an attack model at a first computer network element twice. A first one of the tests is conducted with a first one of the cybersecurity technologies operable to protect the first computer network element, and a second one of the tests is conducted with the first cybersecurity technology not operable to protect the first computer network element. For each one of the twice-tested component stages, comparing results from the first test and the second test, wherein the comparison yields or leads to information helpful in assessing effectiveness of the first cybersecurity technology on each respective one of the twice-tested component stages at the computer network element.

20 Claims, 14 Drawing Sheets

(56) References Cited

U.S. PATENT DOCUMENTS

| | | |
|---|---|---|
| 9,954,884 B2 * | 4/2018 | Hassell ............... H04L 63/1441 |
| 2005/0131828 A1 | 6/2005 | Gearhart |
| 2007/0180522 A1 * | 8/2007 | Bagnall ................... G06F 21/55 |
| | | 726/22 |
| 2011/0016208 A1 * | 1/2011 | Jeong ..................... G06Q 10/06 |
| | | 709/224 |
| 2011/0072506 A1 | 3/2011 | Law et al. |
| 2011/0185432 A1 | 7/2011 | Sandoval |
| 2012/0240185 A1 | 9/2012 | Kapoor et al. |
| 2013/0227697 A1 | 8/2013 | Zandani |

OTHER PUBLICATIONS

Kara Zaffarano, et al; A Quantitative Framework for Moving Target Defense Effectiveness Evaluation; MTD '15 Proceedings of the Second ACM Workshop on Moving Target Defense; Denver, Colorado, USA—Oct. 12-12, 2015.

Siege Technologies; Metrics and Experimentation Report; Technical Information Report, A003 Cyber Agility: A Quantitative Framework for MTD Technique effectiveness Evaluation: (CA) FA8750-14-C-0229 Feb. 2015.

* cited by examiner

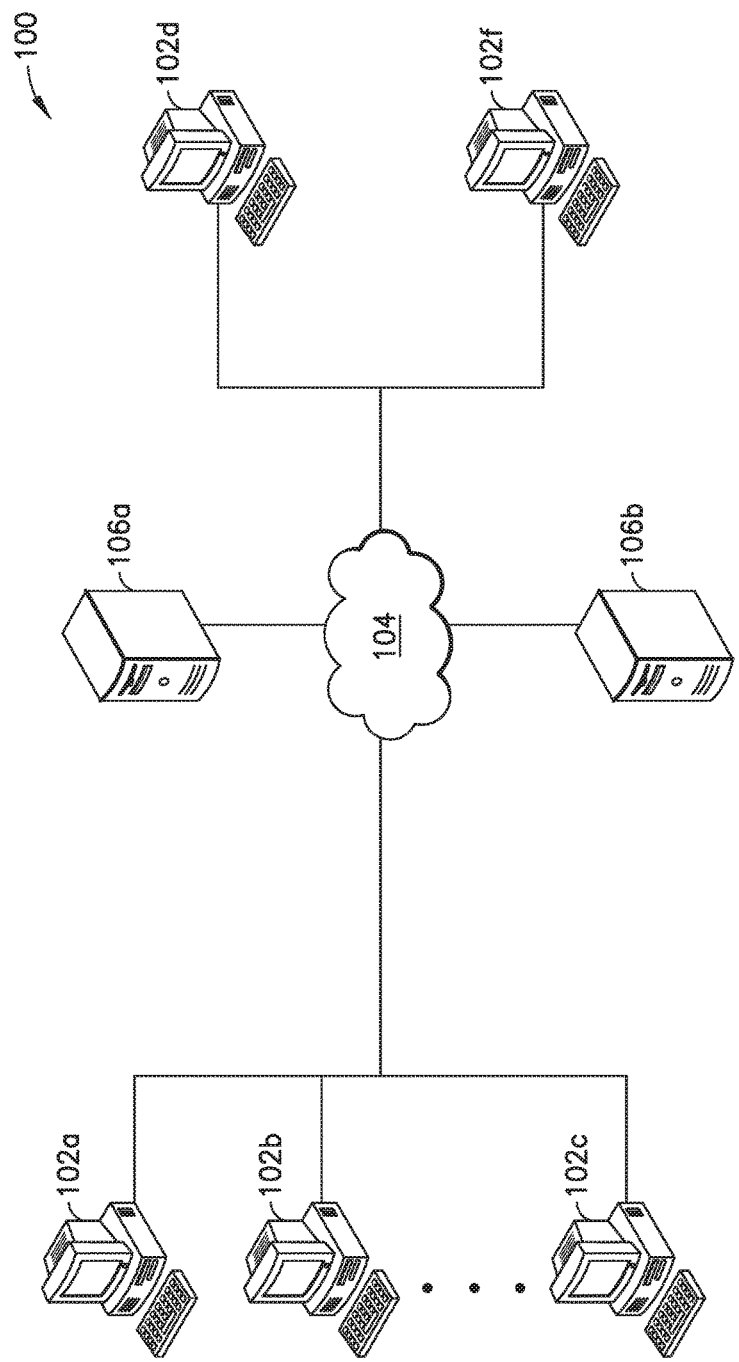
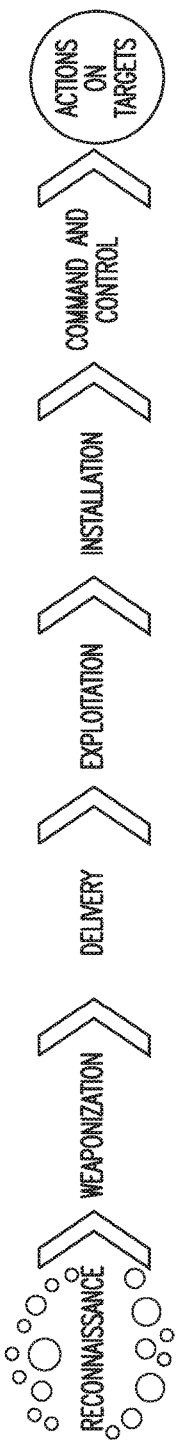
FIG. 1
FIG. 2

PRODUCTIVITY

MISSION WAS COMPLETED IN A TIMELY MANNER!

THE ATTACK TOOK TWICE AS LONG WITH THE MTD ENABLED!

$$\frac{\sum_{i=1}^{numTasks} w_i \times taskDuration_i}{numTasks}$$

SUCCESS

MISSION ACTIVITY WAS SUCCESSFULLY COMPLETED!

THE ATTACK WAS STOPPED BY THE MTD!

$$\frac{\sum_{i=1}^{numTasks} w_i \times taskCompleted_i}{numTasks}$$

CONFIDENTIALITY

CRITICAL DATA WAS HIDDEN FROM THE ADVERSARY!

THE ATTACK WAS DETECTED BY THE MTD!

$$\frac{\sum_{i=1}^{numTasks} w_i \times taskExposed_i}{numTasks}$$

INTEGRITY

MISSION DATA REMAINED UNCHANGED DURING TRANSMISSION!

THE ATTACK WAS DIVERTED BY THE MTD!

$$\frac{\sum_{i=1}^{numTasks} w_i \times taskCorrupted_i}{numTasks}$$

MTD EFFECTIVENESS EVALUATION

MISSION METRICS
- PRODUCTIVITY
- SUCCESS
- CONFIDENTIALITY
- INTEGRITY

ATTACK METRICS
- PRODUCTIVITY
- SUCCESS
- CONFIDENTIALITY
- INTEGRITY

FIG. 7

ASSESSING EFFECTIVENESS OF CYBERSECURITY TECHNOLOGIES

CROSS-REFERENCE TO RELATED APPLICATION(S)

This application claims the benefit of priority to U.S. Provisional Patent Application No. 62/238,974, entitled Assessing Effectiveness of Cybersecurity Technologies, which was filed on Oct. 8, 2015. This application also claims the benefit of priority to U.S. Provisional Patent Application No. 62/374,953, also entitled Assessing Effectiveness of Cybersecurity Technologies, which was filed on Aug. 15, 2016.

The disclosures of both prior applications are incorporated by reference herein in their entireties.

STATEMENT REGARDING FEDERALLY SPONSORED RESEARCH OR DEVELOPMENT

This invention was made with government support under contract FA8750-14-C-0229 awarded by the Air Force Research Laboratory (AFRL). The government has certain rights in the invention.

FIELD OF THE INVENTION

This disclosure relates to assessing effectiveness of one or more cybersecurity technologies.

BACKGROUND OF THE INVENTION

Cybersecurity refers to the body of technologies, including processes, practices, hardware modules, software modules, firmware modules, etc. and combinations thereof, designed to impact networks, computers, programs and data in terms of attack, damage or unauthorized access.

A variety of technologies are available to provide defensive and offensive cybersecurity impact in a computer network environment.

SUMMARY OF THE INVENTION

In one aspect, a method is disclosed for assessing effectiveness of one or more cybersecurity technologies (e.g., defensive technologies) in a computer network.

According to a typical implementation, the method for assessing effectiveness of one or more cybersecurity technologies in a computer network includes testing each of two or more component stages of a model for the identification and prevention of cyber intrusions activity (e.g., based on an attack model) at a first computer network element twice. A first one of the tests is conducted with a first one of the cybersecurity technologies operable to protect the first computer network element, and a second one of the tests is conducted with the first cybersecurity technology not operable to protect the first computer network element. For each one of the twice-tested component stages, comparing results from the first test and the second test, wherein the comparison yields or leads to information helpful in assessing effectiveness of the first cybersecurity technology on each respective one of the twice-tested component stages at the computer network element.

Some implementations include assessing cyber technologies that may include one or more mission components, defensive technology characteristics, and attack components. The assessing may include measuring mission components to assess impact on operations comprising success/failure, timeliness, information exposure, and data corruption, measuring attack components to assess effectiveness of defensive technology against threats comprising success/failure, timeliness, information exposure, and data corruption, and predicting technology assessment for untested configurations comprising new or partial target and attack compositions.

In some implementations, a method includes defining a set of attack, mission, and defense elements at a computer network element to test, posing one or more hypotheses regarding one or more of the defined attack, mission, and defense elements, executing testing of the one or more hypotheses, and identifying one or more missing or uncertain elements.

In some implementations, executing the testing can include testing each of two or more component stages of an attack model at a first computer network element twice. A first one of the tests is conducted with a first one of the defensive cybersecurity technologies operable to protect the first computer network element, and a second one of the tests is conducted with the first defensive cybersecurity technology not operable to protect the first computer network element. The testing also includes analyzing the first computer network element, where analyzing the first computer network element includes, for each one of the twice-tested component stages, comparing results from the first test and the second test. The comparison typically yields or leads to information helpful in assessing effectiveness of the first defensive cybersecurty technology on each respective one of the twice-tested component stages at the computer network element.

The phrase "environment" as used herein should be construed broadly to include, for example, any collection of cyber or networking components of an arbitrary size where activities are carried out to accomplish a mission objective. For example, a particular environment can be a single host, a home network, a business network, or an infrastructure network.

In general, defensive technology environmental performance is measured as the impact instantiation has on mission or attack components. Cyber defense measurements can be taken using various network topology scales ranging from small to large. Scale information can beneficial to the decision process for the best solution for a particular information system and its associated mission.

In a typical implementation, mission components are the building blocks used to carry out tasks in the environment. For example, replying to an email has two components; receiving an email and sending the response. Replying to an email may take longer with a defensive technology in place, where a minor difference may be okay but a large difference may significantly impact production. Client-server configuration is another example mission component, used with a variety of communications servers and clients capable of utilizing those connections. For instance, a mail server is setup with a client (or clients) configured to use the server to send email. The component details described herein may be mission components comprised of a variable number of such components capturing mission building blocks such as email transmission, and the like.

Defensive technologies can also be decomposed into characteristics for later effectiveness deduction at the component level. For example, an anti-virus technology/patch level or firewall/firewall configuration can be described by its characteristics to allow future deductions or predictions of effectiveness in light of different missions or attacks.

Defensive component effectiveness is deduced by measuring the how much protection is gained by measuring the interaction of each defensive component with mission and cyber-attack components. Complete componentization is not necessary, as deductions are possible from partial datasets.

In some implementations, attack components are considered building blocks used to carry out attack tasks in the environment. For example, Nmap is a commonly used network discovery tool. The defensive technology might limit the network visibility exhibited by the tool. Example metrics used to capture the efficiency of the mission and attack component tasks comprising mission productivity, attack productivity, mission success, attack success, mission confidentiality, attack confidentiality, mission integrity, and attack integrity.

Measurements of the attack and mission components can happen at a number of inspection levels comprising host-level, network level, user level, virtualization level, and the like. Several methods exist for which these measures can be collected, comprising simulations, virtualized, physical, hybrid testbeds and live environments.

In some embodiments, the techniques disclosed herein provide a system for assessing and predicting performance of both cyber defensive and offensive technologies within the context of a given mission. The mission is constructed from individual components, and the measured interactive effects with decomposed defensive and offensive cyber components. The advantages of the present invention include, without limitation, that it is a flexible and scalable system. The system is intended to adapt to measure complex networks and complex cyber technologies, as well as host-based defense solutions.

The mission component details of the invention may be comprised of network communications, processing applications, mechanical operations, user activities, and the like. The attack component details of the invention may be comprised of network level attacks, host-based attacks, data exfiltration, privilege escalation, covert communications, side channel attacks, exploitation, social engineering attacks, and the like. Further, the various components of the measurement system can be composed of different mission and attack components or combinations of components.

In some implementations, one or more of the following advantages are present.

For example, new levels insights can be gained, easily and quickly into the effectiveness, and cost/benefit analysis, of various cybersecurity technologies in a computer network environment. These insights can be highly granular and focused on the effectiveness at any one or more specific component stage in a model attack (e.g., in the attack model, described herein). Comparisons between different security options can be made more meaningful.

Moreover, existing testing data on the effectiveness of a particular cybersecurity technology can be used to predict the effectiveness of that cybersecurity technology in other similar networks.

Other features and advantages will be apparent from the description and drawings, and from the claims.

BRIEF DESCRIPTION OF THE DRAWINGS

FIG. 1 is a schematic representation of an exemplary computer network.

FIG. 2 is a schematic representation of an attack model.

FIG. 7 is a schematic representation of four basic metric categories, applied to both the attacker missions, and defender missions.

DETAILED DESCRIPTION

Figure 3:
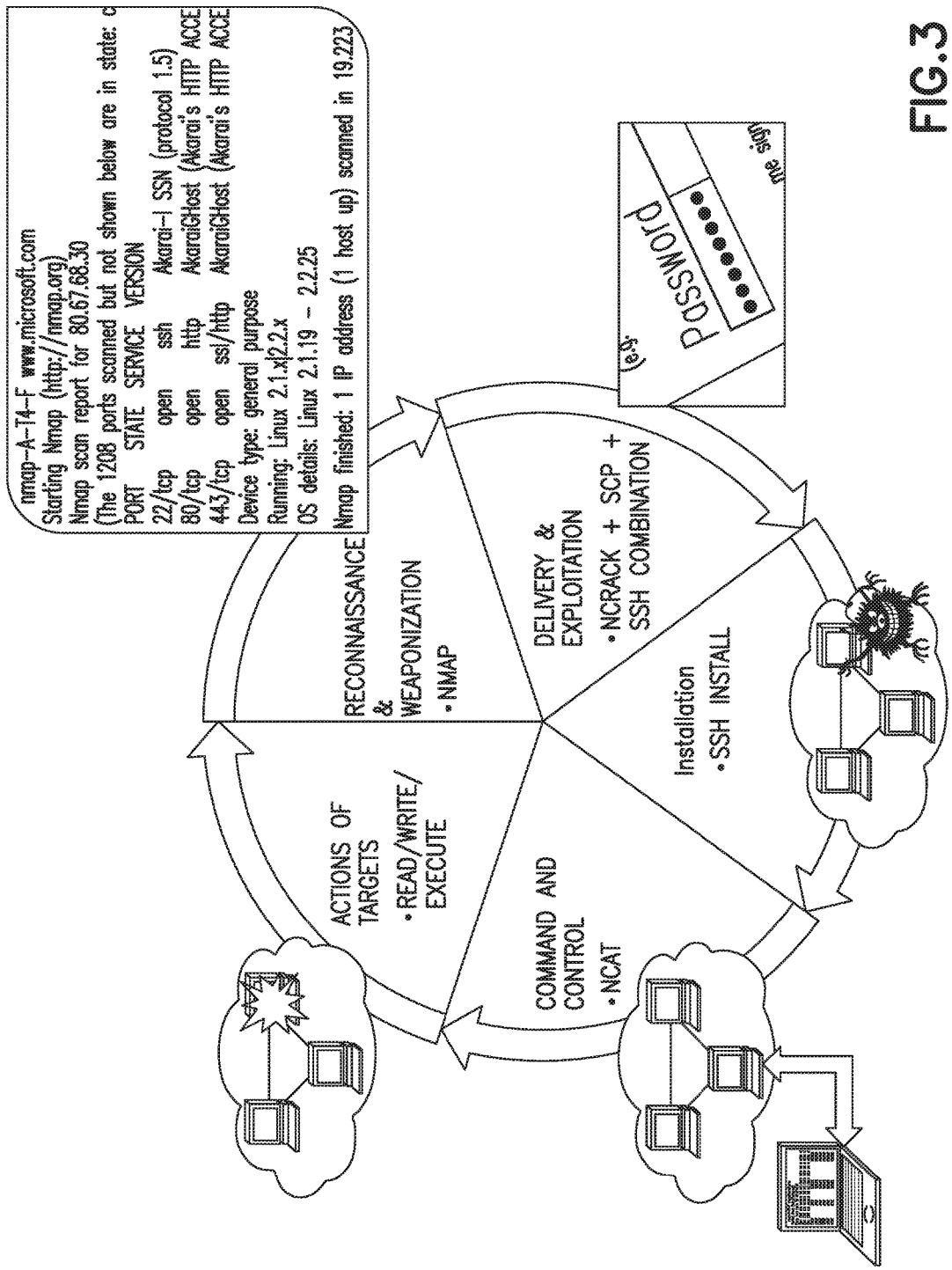
FIG. 3 is a schematic representation showing common adversarial tasks at different stages of an attack model for an exemplary advanced persistent threat.

FIG. 1 illustrates an exemplary computer network 100 that either includes, or can be provided with, one or more cybersecurity technologies, e.g., defensive cybersecurity technologies to protect data and systems in computer networks.

In one rather general sense, cybersecurity refers to the protection of data and systems in computer networks, like computer network 100, which may be connected, for example, to the Internet. Moreover, in some instances, cybersecurity refers to the protection of information systems on a network (e.g., network 100) from theft or the like, damage to network hardware, software, and/or information on them, as well as from disruption or misdirection of the services they provide.

Again, generally speaking, some defensive cybersecurity technologies can be considered computer-implemented actions, devices, procedures, or techniques that reduce a threat, vulnerability, or attack on the network, or a network component, by eliminating or preventing it, by minimizing the harm it can cause, or by discovering and reporting it so that corrective action can be taken. There are a variety of ways in which different defensive cybersecurity technologies implement these functionalities including, for example, by controlling physical access to network hardware, protecting against harm that may come via network access, data injection and code injection, and due to malpractice by operators, whether intentional, accidental or due to trickery that leads to deviating from secure procedures.

Cybersecurity is critical in most industries that rely on computer networks including. Some larger targets for cybersecurity threats include, for example, the financial industry, utilities and industrial equipment, aviation, consumer devices, large corporations, the automobile industry, the government, etc. Depending on the particular attack, serious harm can come to the target of a breach in cybersecurity.

Again, generally speaking, a defensive cybersecurity technology is some technical measure that may be implemented on a computer network (e.g., 100) in hardware, software, firmware, or a combination thereof, to protect the network against a cyberattack. There are numerous types of defensive cybersecurity technologies, some of which include, for example, security measures, reducing vulnerabilities, security by design, security architecture, hardware protection mechanisms, secure operating systems, secure coding, capabilities and access control lists, responses to breaches, etc.

able payload(s), delivery relates to transmission of a payload to targeted environment, exploitation relates to execution of the payload to gain access, installation relates to persistent code instantiation, command and control relates to remote communications, and actions on targets relates to data collection, exfiltration, propagation, and malicious operations. An advanced persistent threat (APT) is a set of stealthy and continuous computer hacking processes, often orchestrated by human(s) targeting a specific entity.

Additional detail about attack model phases is outlined in Table 1.

TABLE 1

Details of the Attack model Stages

| Attack model Phase | Definitions |
| --- | --- |
| Reconnaissance | Research, identification and selection of targets, often represented as crawling Internet websites such as conference proceedings and mailing lists for email addresses, social relationships, or information on specific technologies. |
| Weaponization | Coupling a remote access trojan with an exploit into a deliverable payload, typically by means of an automated tool (weaponizer). Increasingly, client application data files such as Adobe Portable Document Format (PDF) or Microsoft Office documents serve as the weaponized deliverable. |
| Delivery | Transmission of the weapon to the targeted environment. The three most prevalent delivery vectors for weaponized payloads by APT actors are email attachments, websites, and USB removable media. |
| Exploitation | After the weapon is delivered to victim host, exploitation triggers intruders' code. Most often, exploitation targets an application or operating system vulnerability, but it could also more simply exploit the users themselves or leverage an operating system feature that auto-executes code. |
| Installation | Installation of a remote access trojan or backdoor on the victim system allows the adversary to maintain persistence inside the environment. |
| Command and Control (C2) | Typically, compromised hosts must beacon outbound to an Internet controller server to establish a C2 channel. APT malware especially requires manual interaction rather than conduct activity automatically. Once the C2 channel establishes, intruders have "hands on the keyboard" access inside the target environment. |
| Actions on Objectives | Only now, after progressing through the first six phases, can intruders take actions to achieve their original objectives. Typically, this objective is data exfiltration which involves collecting, encrypting and extracting information from the victim environment; violations of data integrity or availability are potential objectives as well. Alternatively, the intruders may only desire access to the initial victim box for use as a hop point to compromise additional systems and move laterally inside the network. |

There are also numerous ways to test defensive cybersecurity technologies including, for example, penetration testing, sometimes called pentesting, which includes performing a mock attack on a computer network to looks for security weaknesses. Pentesting, and other assessment techniques, may be part of a broader computer security audit, which, generally speaking, is a systematic technical assessment of a network's computer security.

There are several ways to model a successful cybersecurity attack, some of which would include multiple steps or stages in an attack. One such model, expressed in FIG. 2, and representing a specific model of Advanced Persistent Threat (APT) behavior, identifies up to seven discrete steps (or stages) in a typical attack model. Of course, not all threats would necessarily use or involve every stage. Moreover, the actions available at each stage can vary, giving an almost unlimited diversity to attack sets. In this exemplary model, the steps or stages include: reconnaissance, weaponization, delivery, exploitation, installation. command and control, and actions on targets or objective.

Generally speaking, in the advanced persistent threat context, reconnaissance relates to target identification, weaponization relates to linking exploitation with deliver- Individual cybersecurity technologies are generally not designed to provide complete security against actions at every stage of the attack model. Instead, different cybersecurity technologies provide varying degrees of protection against actions at each stage.

FIG. 3 shows common adversarial tasks at different stages of the attack model for an exemplary advanced persistent threat (APT). By categorizing adversarial tasks according to attack model stages, it is possible to characterize the defensive benefits of different cybersecurity technologies against different stages of attack.

According to the example shown in FIG. 3, the Nmap network mapper (Nmap) is an example of a reconnaissance & weaponization tool. Generally speaking, Nmap can be used to discover hosts and/or services on a computer network, thus creating a "map" of the network. To accomplish this goal, the Nmap network mapper typically sends specially crafted packets to the target host and then analyzes the responses. Nmap features can include, for example, host discovery (e.g., identifying hosts on a network), port scanning (e.g., enumerating the open ports on target hosts), version detection (e.g., interrogating network services on remote devices to determine application name and version number), operating system detection (e.g., determining the operating system and hardware characteristics of network devices), scriptable interaction with a target (e.g., using Nmap scripting engine (NSE) and Lua programming language. Nmap can provide further information on targets, including reverse DNS names, device types, and MAC addresses. Additionally, Nmap can be used to Find and help exploit vulnerabilities in a network. Moreover, since Nmap is a tool that can be used to discover services running on Internet connected systems, it could potentially be used for black hat hacking, for example, as a precursor to attempts to gain unauthorized access to a computer system or network.

According to the illustrated example, a combination of Ncrack+secure copy protocol (SCP)+secure shell protocol (SSH) act as an example of a delivery & exploitation tool. Generally speaking, Ncrack is a high-speed network authentication cracking tool and SCP is a means of securely transferring computer files between a local host and a remote host or between two remote hosts, based on the installation tool, SSH.

According to the illustrated example, Ncat is an example of a command and control tool, and read/write/execute are examples of an action on targets tool.

Returning now to FIG. 1, the illustrated computer network 100 is essentially a telecommunications network, which allows computers to exchange data. In the illustrated computer network 100, the networked computing devices exchange data with each other along network links (data connections). Network computer devices that originate, route and terminate the data are called network nodes. Nodes can include, for example, hosts, such as personal computers, phones, servers or networking hardware. Two such devices are considered to be networked together when one device is able to exchange information with the other device. Connections between nodes in a network are generally established with cable media, wireless media or a combination thereof.

Computer networks can use a variety of different transmission media to carry signals, communication protocols to organize network traffic. They can have a variety of different sizes and topologies. Moreover, computer networks can support a variety of applications, such as ones that provide access to the Internet, shared use of application and storage servers, printers, and use of email and instant messaging applications.

In the illustrated network 100, for example, there are multiple personal computers 102a-102e interconnected as indicated, some of which being interconnected over the Internet 104, and servers 106a, 106b accessible from the computers via the Internet 104.

Figure 4:
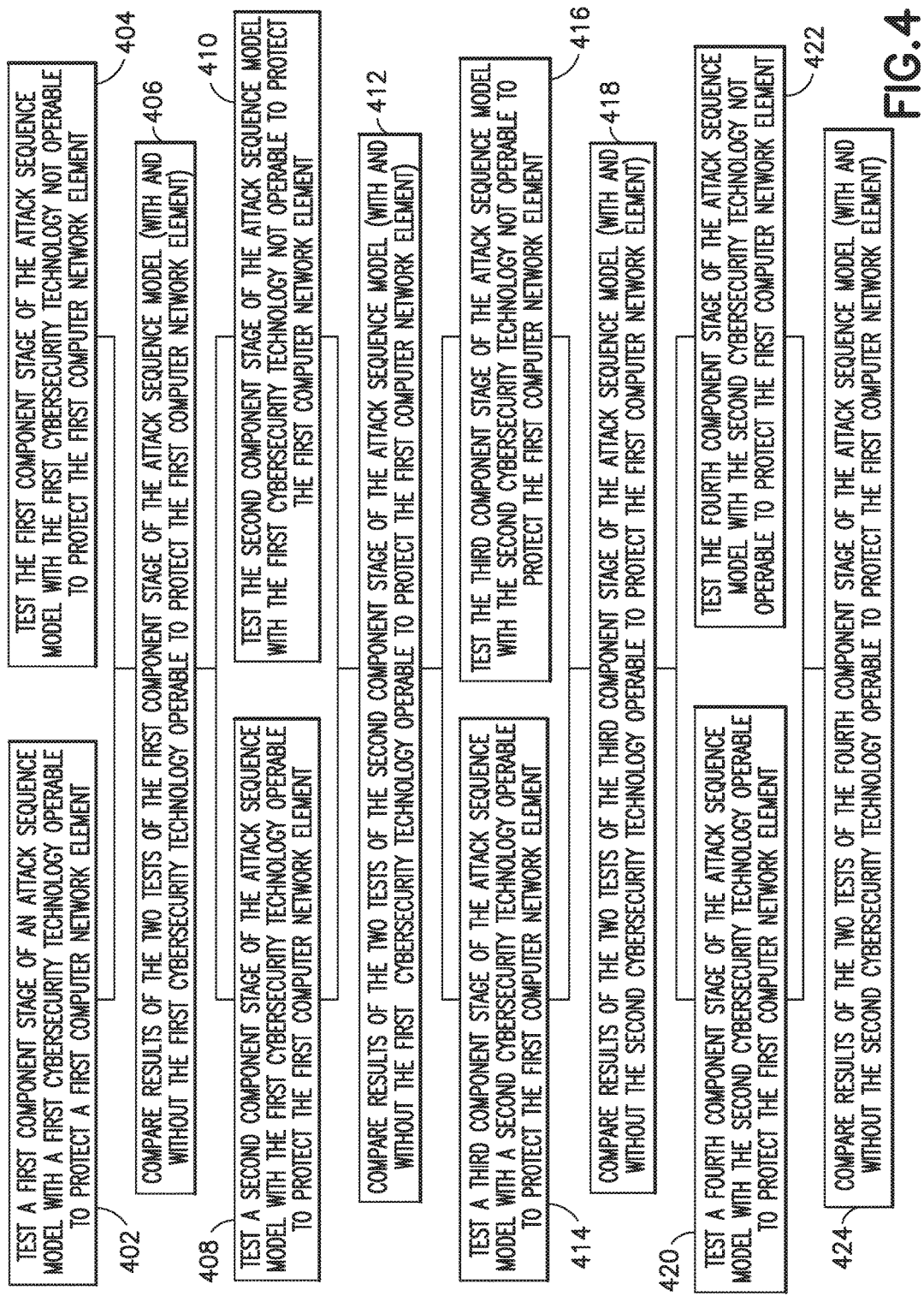
FIG. 4 is a flowchart of an exemplary process for assessing effectiveness of one or more cybersecurity technologies in a computer network.

FIG. 4 is a flowchart representing an exemplary implementation of a method for assessing effectiveness of one or more cybersecurity technologies in a computer network, such as the computer network 100.

In general terms, the illustrated method is based on an attacker model that aims to perform activities from several stages of an attack model (e.g., the attack model), and not necessarily in order. This makes the attacker model less realistic, in some sense, but, in another sense, improves the data that it provides. For instance, if a given cybersecurity technology is particularly successful at preventing reconnaissance and delivery, it may be very difficult to obtain real-world data about the technology's effectiveness against later attack model stages. By including tasks representative of various stages, it is possible to make better assessments of the form "cybersecurity technology X is good at stopping reconnaissance, but does little against command and control," which is more valuable than "cybersecurity technology X is good at stopping reconnaissance, and we don't know how it handles command and control, because no attacker ever made it that far." As such, the process expressed in the illustrated flowchart may include representative tasks from a variety of the attack model stages, but also to recognize that a technology's inability to prevent certain types of activities is not necessarily an indictment of its intended effectiveness.

According to the illustrated flowchart, the method of assessing effectiveness of one or more cybersecurity technologies in a computer network includes testing each of two or more component stages of an attack model at a first computer network element twice—once (at 402 and 408) with one of the cybersecurity technologies operable to protect the first computer network element, and once (at 404 and 410) with the first cybersecurity technology not operable to protect the first computer network element. For each one of the twice-tested component stages, the method includes comparing (at 406 and 412) results from the first test and the second test. In a typical implementation, this comparison yields or helps lead to information that is helpful in assessing effectiveness of the cybersecurity technology on each respective one of the twice-tested component stages at the computer network element.

In a typical implementation, for each specific cybersecurity technology to be tested, its effectiveness at different respective stages (or components) of the attack model will be considered. In fact, in some instances, testing for a specific cybersecurity technology may occur at every component stage of the attack model. Again, the component stages of the attack model mentioned above include reconnaissance, weaponization, delivery, exploitation, installation, command and control, and action on target.

Thus, in some instances, it may be possible to gain an understanding of the effectiveness of a particular cybersecurity technology on every stage in an attack model (i.e., reconnaissance, weaponization, delivery, exploitation, installation, command and control, and action on target), irrespective of its effectiveness on the other stages.

Of course, the results of testing one cybersecurity technology (on one or more of the attack model stages) can be compared against the results of testing a different cybersecurity technology (on the same one or more attack model stages). This will allow a side-by-side comparison of effectiveness, which may be useful in a variety of situations, including, for example, planning and/or auditing network cybersecurity.

Thus, as shown in the illustrated flowchart, the method can include, after testing a first cybersecurity technology, subsequently testing a different, second cybersecurity technology. More particularly, in the illustrated flowchart, this subsequent testing includes testing each of the two or more component stages of the attack model at the first computer network element twice—once (at 414 and 420) with the second cybersecurity technologies operable to protect the first computer network element, and once (at 416 and 420) with the second cybersecurity technology not operable to protect the first computer network element.

For each of these twice-tested component stages, results from the first and second tests may be compared (at 418 and 424) to determine an effectiveness of the second cybersecurity technology. More particularly, in a typical implementation, this comparison yields or leads to information helpful in assessing effectiveness of the second cybersecurity technology on each respective one of the subsequently twice-tested component stages at the computer network element.

Then, in a typical implementation, the results of the testing that involved the first cybersecurity technology are compared to the results of the testing that involved the second defensive cybersecurity technology. In a typical implementation, this comparison can yield or lead to information helpful in assessing effectiveness of the first defensive cybersecurity system relative to the second defensive cybersecurity technology.

At a high level, in certain implementations, each "testing" is a series of test phases: (i) Initialize; (ii) Run; (iii) Collect Data; and (iv) Cleanup. The Run phase has a few sub-steps (sometimes call these "time slots," because they are generally processed at scheduled times). Here are some details on what happens in each of the stages, during an exemplary implementation:

Initialize: This phase includes creating the virtual machines and virtual network infrastructure needed for a test, and copying any prerequisite files to the virtual machines and/or virtual network. Although software installers may be copied to virtual machines during this phase, in a typical implementation, software is not actually installed and hardware is not configured until the Run phase.

Run: This phase involves actually configuring the software and hardware environment of a virtual machine, starting data collection sensors, running the primary activity that is the subject of the test, stopping the sensors, and cleaning up (if necessary). Details about these time slots:

Initialize Run: The initialize and setup time slots are similar; but the initialize time slot is when connecting to the network, and similar functions, are performed. In general, initialize tasks support subsequent setup tasks.

Setup: During this time slot, software is installed on virtual machines. Software may be application software, or sensor software that performs experimental data collection, or the defensive technology being tested.

Start Sensors: In this time slot, data collection sensors and defensive technologies are launched. This time slot typically runs for some time before the "Main" time slot begins, providing some baseline data to compare against data collected during the "Main" time slot.

Main: In this time slot, the activity being investigated is performed.

Stop Sensors: In this time slot, data collection sensors (and defensive technologies, if necessary) are stopped.

Cleanup: (Like "initialize," "cleanup" also refers to a test phase as well as a time slot.) If any cleanup on the virtual machine is required, it is performed here.

Collect Data: In this test phase, data collected by the sensors is retrieved, as well as data produced by other software on the virtual machines. This data is the raw data result of the experiment. Any subsequent analysis can be based on the data retrieved during this test phase.

Cleanup: This (optional) test phase is for destroying any artifacts created during the test execution. Virtual machines and virtual networking devices are destroyed. This test phase can be disabled upon request, to allow manual inspection of the testbed after a test.

Figure 5:
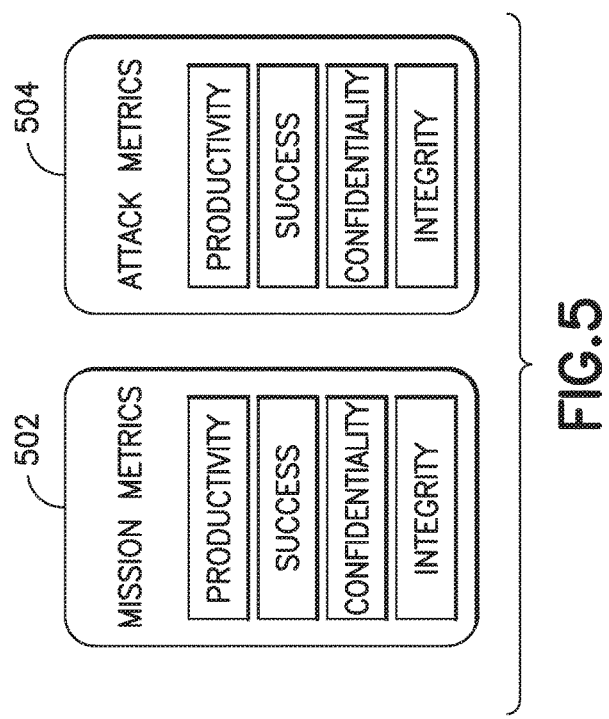
FIG. 5 is a schematic representation of exemplary mission and attack metrics.

There are a variety of metrics that may be considered in testing effectiveness of a particular defensive cybersecurity technology. FIG. 5 is a schematic representation showing certain metrics that may considered in assessing effectiveness of defensive cybersecurity technologies according to one exemplary embodiment.

According to the illustrated embodiment, the metrics include mission metrics 502 and attack metrics 504. The mission metrics include mission productivity, mission success, mission confidentiality and mission integrity. The attack metrics include attack productivity, attack success, attack confidentiality and attack integrity. Each of these metrics is described in the table that appears in the figure.

What follows is a specific example of some of the techniques disclosed herein applied to assessing effectiveness for a Moving Target Defense (MTD). This example is intended to elucidate, not limit, some of the concepts expressed herein.

Static defense is sometimes a brittle mechanism for defending against cyberattack. Despite this, proactive defensive measures have not been widely deployed. This may be at least in part because flexible proactive defensive measures such as MTD can have as much potential to interfere with a network's ability to support the mission as they do to defend the network. An approach is introduced herein to defining and measuring MTD effects applied in a network environment to help guide MTD deployment decisions that successfully balance the potential security benefits of MTD deployment against the potential productivity costs.

There is a wide range of potential mechanisms for utilizing MTD technologies to improve security, at both the host and network level. Here, we will be concentrating on metrics associated with network level defenses. A common approach is to utilize an intelligent modeling algorithm to selectively modify configurations based on circumstance.

Some approaches to moving target defense make no attempt to tune policy to circumstance, but instead deploy mechanisms to continuously change configurations while enabling valid users to reliably interact with the network, while leaving invalid users the challenge of penetrating the network despite constant reconfiguration. IP hopping is a common one of these approaches, where IP addresses are constantly in motion.

In order to compare and evaluate the potential costs and benefits of these various approaches, it is important to be able to quantify the security benefits associated with each approach along with potential productivity costs that may be introduced (either through the overhead associated with deployment of the system, or potential interference such a system may introduce to legitimate network operations). There are several potential mechanisms for doing such a comparison, ranging from pure analytical approaches based on mathematical analysis, coarse grained simulation, data gathered from testbeds or cyber ranges of representational networks with real missions, and experimentation and instrumentation of real operational networks. Each of these approaches represents a different tradeoff between analysis cost and accuracy of results.

The focus of this example is on metrics and analysis approaches that utilize cyber testbeds, as this may, in some instances, represent highly realistic data that can be gathered short of operational deployment experiments, which are often implausible without having first gathered strong evidence that such experiments are worthwhile and will cause no harm to ongoing operations.

According to this method, measuring the effectiveness of network oriented MTD technologies involves developing two coordinated techniques: (i) mechanisms for gathering data on effectiveness; and (ii) metrics that process that data and extract effectiveness measurements. Security, productivity, and the appropriate tradeoff between the two cannot be statically evaluated in way that is equally applicable to all parties considering the potential deployment of an MTD technology. As such, the approach described herein is to define multiple metrics that measure different areas of potential interest, and to persist and maintain the raw data from which metric results are derived. If new metrics are developed in the future that better represent the needs of an enterprise customer, the raw data can be used to calculate results for the new metric without rerunning experiments.

Figure 6:
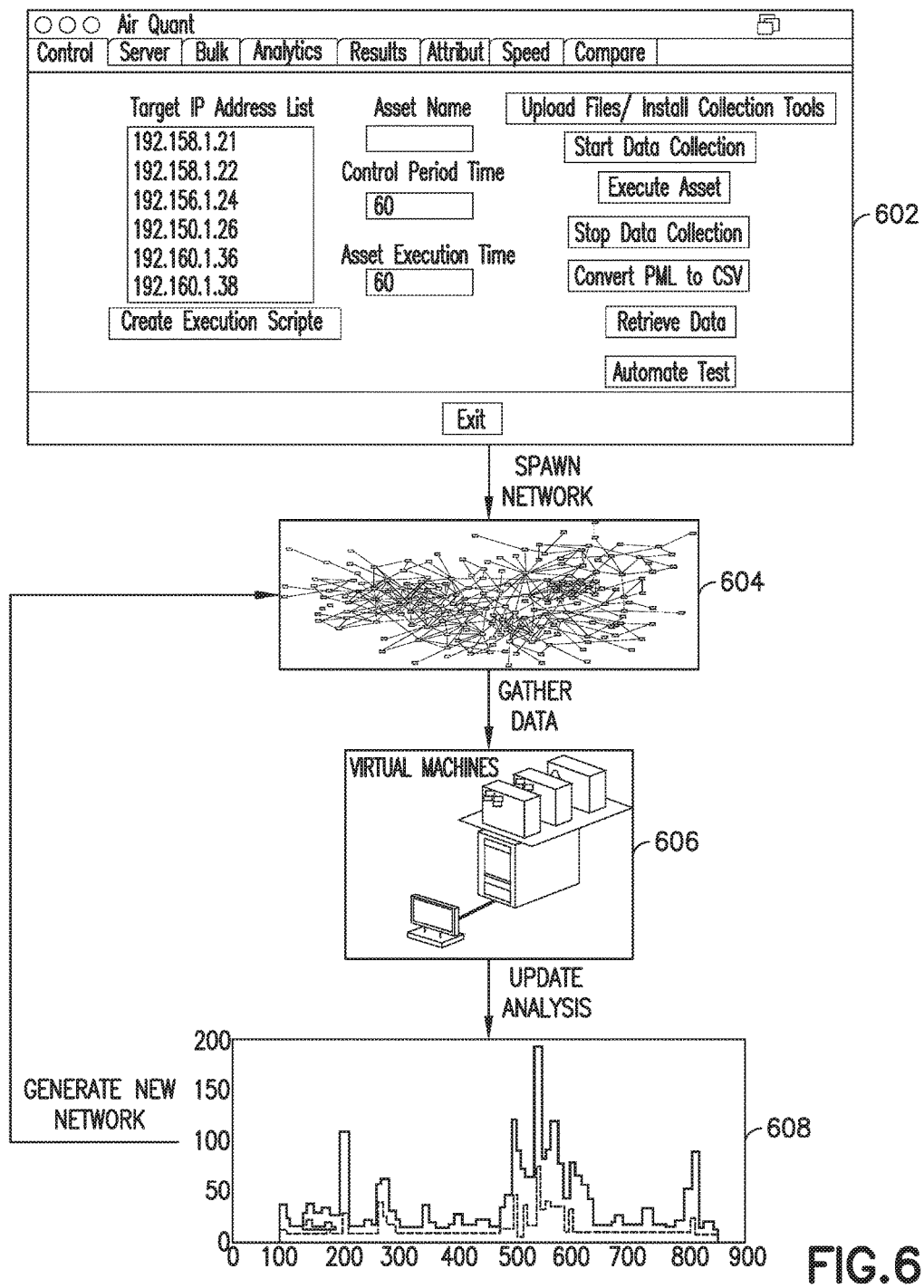
FIG. 6 illustrates an exemplary experimental workflow.

FIG. 6 illustrates an exemplary experimental workflow. An initial launch panel 602 enables configuration of an experiment, and allows for viewing and analysis of results while an experiment is in progress. Once an experiment is configured, it will automatically spawn a network of virtual machines 604 configured with custom software to replicate mission oriented network activity, and a set of sensors to gather data (at 606). The method involves executing realistic missions with and without cyberattacks, gathering data, and then updating analysis (at 608) of what pre-conditions make sense before launching the technology under test, and what post-launch conditions should be expected. As this analysis is being updated, a new topology is configured and an experimental instance is launched, and the process is repeated until the experiment stopping condition is reached (which may be in a time limit, or reaching certain pre-identified statistical significant measurements for certain metric measurements).

One approach to cyber metric design is to try to quantify the effect the system under test has on three aspects of the mission data owing through the system, confidentiality, integrity, and availability of data. In general, confidentiality refers to the ability to ensure data only gets exposed to those intended to have it, integrity refers to ensuring that data is not modified inappropriately, and availability refers to ensuring the data is delivered to those that legitimately request it.

Another approach is inspired by the foregoing approach, but modified to address information operation issues that the above approach does not directly address. For example, there are conditions under which an MTD might fail to stop an attack, but is still able to monitor and log much more fine grained detail on attack operations that allow for improved attribution or post-attack characterization of the attacker. Such benefits are important, but not well represented in some information assurance metrics. In the approach disclosed herein, we explicitly model a range of potential attacker and defender (or mission) objectives, and then run multiple experiments to collect data on the interaction between these objectives and the MTD. Metrics are derived from the statistical differences between these interactions during runs when an MTD is not deployed (the baseline) and when it is deployed.

FIG. 7 shows the four basic metric categories, applied to both the attacker missions, and defender missions. Each category is described briefly in the following table.

| | |
|---|---|
| Productivity | Mission Productivity: the rate at which mission tasks are completed |
| | Attack Productivity: how quickly an attacker can perform and complete adversarial tasks |
| Success | Mission Success: the amount of attempted mission tasks that are successfully completed |
| | Attack Success: how successful an attacker may be while attempting to attack a network |
| Confidentiality | Mission Confidentiality: how much mission information is exposed to eavesdroppers, can be intercepted, etc. |
| | Attack Confidentiality: how much attacker activity may be visible to detection mechanisms |
| Integrity | Mission Integrity: how much mission information is transmitted without modification or corruption |
| | Attack Integrity: the accuracy of the information viewed by an attacker |

A typical implementation involves the utilization of an automated testbed for testing and measuring cyber effects as part of a workflow for designing cyber capabilities. Measuring the effectiveness of MTD technologies, may involve adapting and leveraging a Cyber Quantification Framework (CQF) developed by Siege Technologies, Inc.

Figure 8:
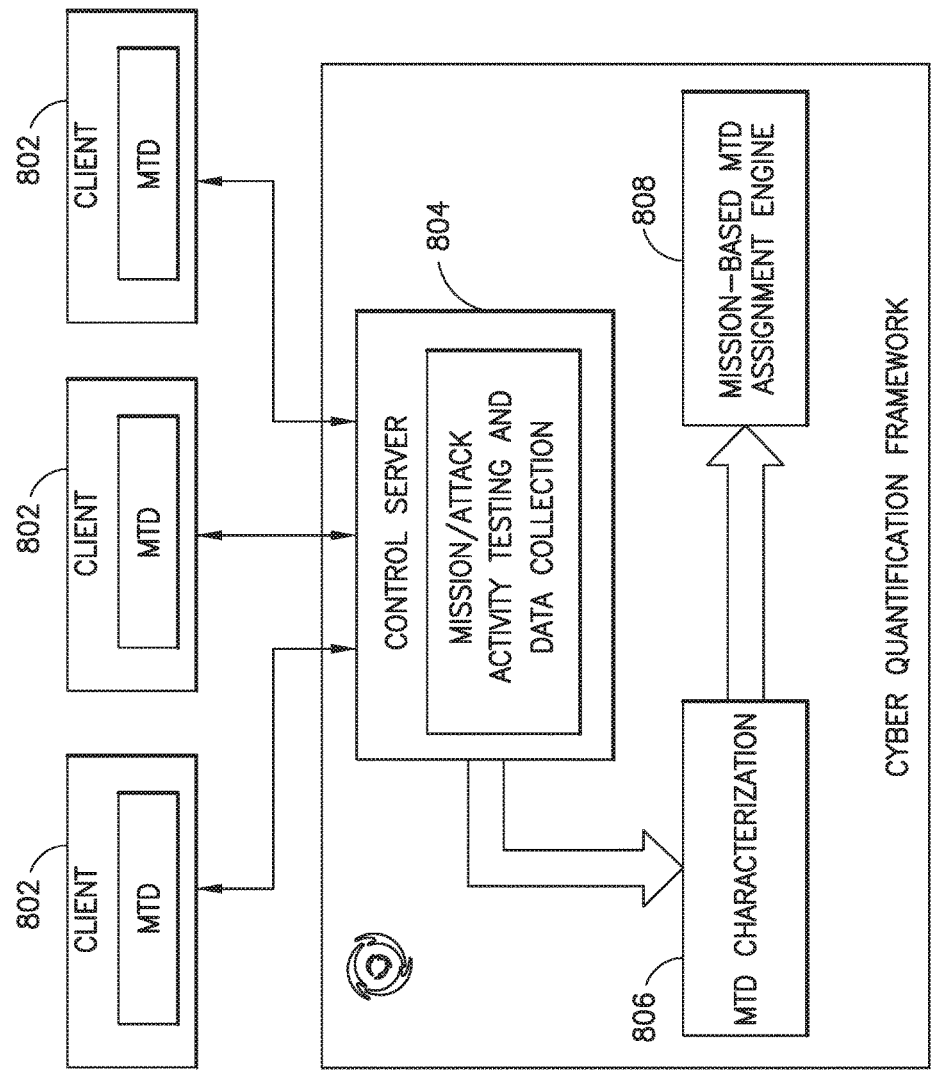
FIG. 8 outlines an exemplary MTD effectiveness characterization process implemented within a cyber quantification framework.

FIG. 8 outlines the MTD effectiveness characterization process implemented within the CQF. Siege's Cyber Quantification Framework (CQF) can be used for experimental quantitative assessment of various types of cyber-assets, including both hardware and software. The CQF combines a user-friendly interface for designing large-scale experiments, sophisticated integration with virtualization servers (currently VMware vSphere, but the workflow can be ported to other virtualization systems, or adapted to physical cyber-ranges), and a workbench for data analysis and visualization.

According to the illustrated example, information about multiple clients 802 with MTDs is loaded into a control server 804. The control server 804 performs mission/attack activity testing and data collection. This produces MTD characterization data 806, which is fed to a mission-based MTD assignment engine 808.

Figure 9:
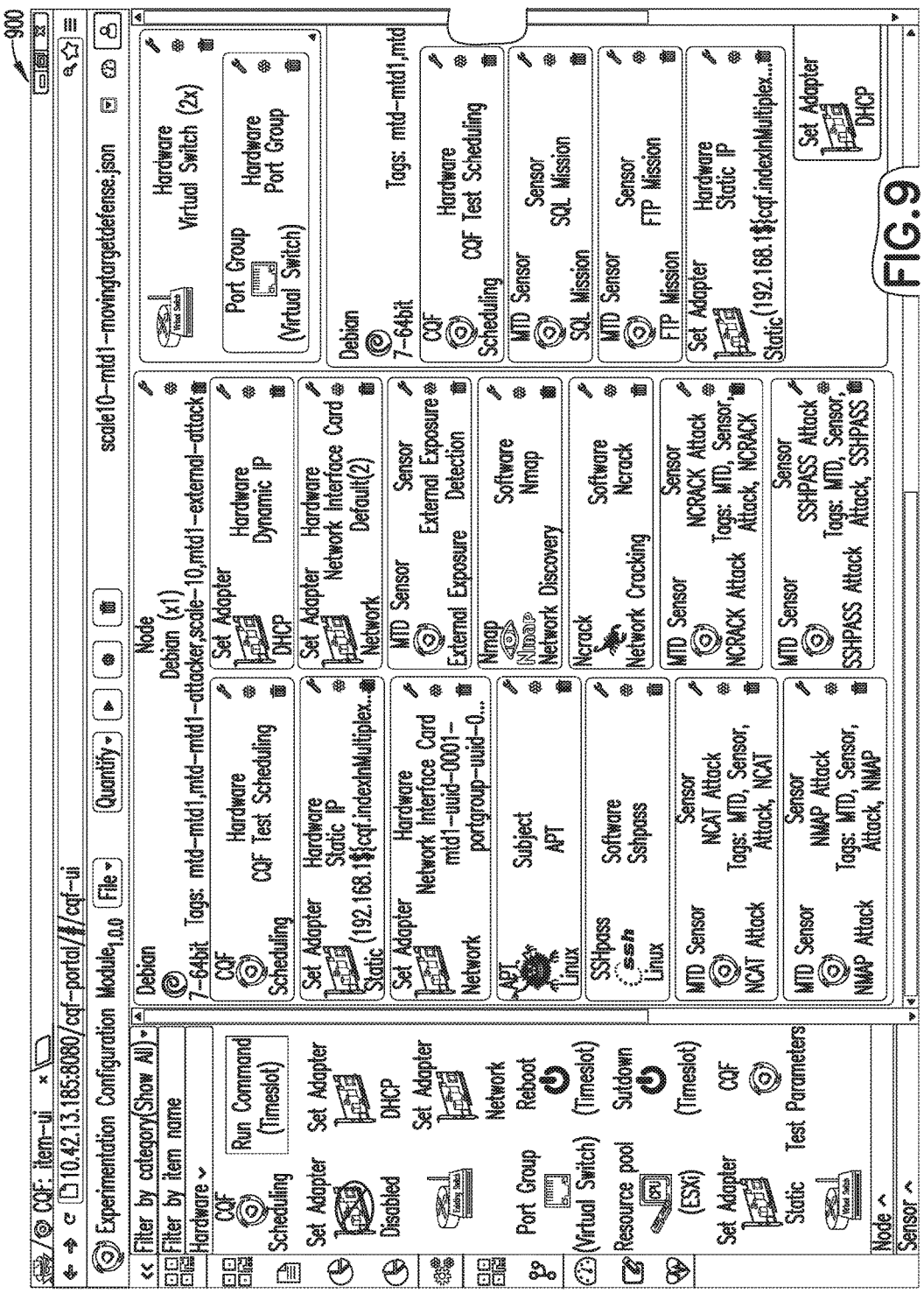
FIG. 9 shows an exemplary computer browser-based experiment configuration interface.

FIG. 9 shows the browser-based experiment configuration interface 900. The drag-and-drop user interface (UI) presents categories of "items" on the left hand side that can be dragged into the central workspace. Top level items represent (virtual) hardware elements such as routers or switches, and virtual machine templates. Other non-top level items are dragged into these, and encapsulate additional test parameters, such as software that can be installed on virtual machines, data collectors that can be deployed to virtual machines during experimentation, and virtual networks that can be established on virtual routers.

Some large scale quantification work focuses on creating large numbers of virtual machines and performing individual experiments and data collection on each virtual machine; that is, experiments that were large scale in the sense that a large number of machines were created, configured, and run, all at once. However, this approach is not immediately applicable to the evaluation of network-based MTDs because these require entire networks in order to exhibit realistic and representative behavior.

Experimental processes for network-based MTDs generally involve automated network construction and configuration, as well as automated stimuli that operate on the network. Rather than using network traffic simulators, which are often based on mimicking the load and traffic behaviors of real networks, the techniques disclosed here use the concept of activity models, wherein an activity model is a collection of tasks, each of which has a number of observable attributes, such as whether it successfully completes, how long it takes to complete, whether any transmitted data is corrupted, and whether any transmitted data is sent on the wire in plaintext. The activity model approach is not intended to produce traffic with the most realistic dynamics, but rather to be instrumentable, reproducible, and immediately sensitive to the characteristics of MTDs under consideration, namely, their effectiveness and their cost, as an example.

In the following sections, we describe the process of automated network topology generation, the formal representation of activity sets, and the instantiation of activity sets that correspond to mission-oriented and attacker-oriented behavior.

To properly assess an MTD's applicability to a mission, a variety of mission relevant topologies should be assessed. In order to gather data on a large enough scale to fairly judge the technology, it is desirable to be able to automate the generation of different network topologies and conditions. One such approach involves leveraging the existing vSphere and ESXi infrastructures and a browser-based web application that has been developed for test administration. The test administration application orchestrates the automated deployment of a range of varied network topologies containing a heterogeneous collection of hosts running versions of Linux and Microsoft Windows, along with associated routers and other network components necessary for realistic data generation and collection.

Each MTD technology under test has a set of operating systems and configuration options, which are instantiated during topology generation through the dynamic creation of linked clones and network infrastructures needed to automate the process of topology generation. The concept takes base installations of operating systems to create the compatible mission component nodes, as well as arbitrary nodes that may exist on a network, and applies the desired network structure. This generation also includes nodes that apply operation simulation such as the server types listed in the following table.

| Server Type | Operation Simulation |
|---|---|
| Application Server | User & database middleware |
| Message server | Chat server |
| File Server | Connection through FTP |
| Mail Server | Email transmission |
| Database Server | SQL, data retrieval |
| Web Server | Browser usage |

To help ensure metrics can be effectively calculated that account for scalability effects, we need to be able to generate topologies of different scales and complexities. We approach this by outlining network characteristics on a mission by mission basis. Thus, each mission template represents a range of different possible topologies that would support such a mission, along with associated network mission characteristics. As such, our approach differs from pure random topological generation approaches. A disadvantage of this approach is that the network has an unnaturally even distribution of nodes, with fewer bottlenecks and other network elements that can affect performance behavior. Instead, we adapt a parameterized approach wherein a hierarchical structure is imposed to generate representative networks in line with observed power law distribution models, as well as other characteristics frequently seen in real networks but not in randomly generated ones. Once the hierarchical structure is imposed we aim for a Heavy-Tailed (skewed) distribution of nodes. We do this by distributing the number of nodes on each subgraph in the hierarchy by picking a number of nodes in accordance to a bounded Pareto distribution. The result is a series of realistic representative networks tailored by mission type. This allows us to not only analyze data across all mission types, but also specify effectiveness for a subset of network characteristics and mission types of interest to a potential user of the MTD under test.

We define an activity model as the combination of a set of tasks and a set of task attributes. Each task represents an individual instance of an activity. For instance, an activity model with three tasks might have the tasks: (i) user A sends an email to user B; (ii) user B sends an email to user A; and (iii) user C views a web page. Each task attribute identifies a property for which each task in the task set has a value and the range of values that the property can assume. For instance, the aforementioned activity model might have two task attributes: (i) task begin time, the value of which must be a time point; and (ii) task duration, the value of which must be a temporal duration.

Symbolically, we represent an activity model as a tuple $\{T;A\}$ where $T=\{t1, \ldots, tn\}$ is a set of n tasks, and $A=\{a1, \ldots, am\}$ is a set of m attributes. A run of a model is a process that produces a dataset, which is a mapping function $v: T \times A \rightarrow V$ which takes a task t and an attribute "a" to a value from the permissible values for the attribute "a."

For instance, a run of the activity model described above could be the process where we:
  Ask a colleague A to send an email to another colleague B and record the time at which A begins composing the email and how much time elapses until hitting the send button.
  Ask a colleague B to send an email to A, after installing a sensor on B's workstation that records the time when the "Write Email" button is pressed and the time when the "Send" button is pressed.
  Visit a web page, and time how long it takes to read it. Later, retrieve the server logs to determine when the web page was requested.

After executing this run, attributes for each task can be determined. This run is somewhat artificial, but illustrates several important points:
  A run may produce attribute values indirectly. For instance, there may be multiple ways of determining when a user begins the process of emailing another user.
  A run need not determine attribute values in the same way for each task.
  A run may synthesize attribute values from data that are easier to collect. For instance, it may be easier to determine when a user begins to perform an activity by information collected by the system with which the user is interacting rather than from the user.

We now define two specific activity models whose tasks have the same set of attributes. The first is a mission activity model, whose activities correspond to legitimate network activities, such as sending email, and retrieving content from a database. The second is an attacker activity model, whose activities correspond to the types of actions an attacker would perform. These two activity models use the same set of attributes (though the mechanisms for collecting attribute values may differ for the different types of tasks). These attributes are:
  duration: length of time to complete the task execution, values are non-negative real numbers;
  success: whether the task was successfully completed, values are 0 (task did not complete successfully) and 1 (task completed successfully);
  unexposed: whether task information was exposed, values are 0 (information was exposed) and 1 (information was not exposed);
  intact: whether task information was corrupted, values are 0 (information was corrupted) and 1 (information was not corrupted).

The attribute list in this example was chosen to be representative enough of real network traffic, while providing concrete, quantifiable data to a metrics subsystem described herein.

The mission tasks will apply to the mission oriented metrics; mission productivity, mission success, mission confidentiality, and mission integrity. Each test network will have a variable number of clients and an assortment of activity servers configured for use within the enclave, e.g.: Mail Server; File Server; Database Server; and Web Server. This list was chosen to represent multiple communication mechanisms sufficient to identify potential operational issues introduced by an MTD technology under test.

A standard suite of mission task servers is based on monitoring communications between user workstations. MTDs may affect these types of communications in different ways. For instance, some chat protocols are based on establishing peer-to-peer connections, while others route all messages through a central server; some servers depend on privileged ports, while others use unreserved high port numbers), and missions may make use of different selections of these services.

Each client will perform mission tasks such as the following: sending and retrieving email, downloading files with FTP, querying a database with SQL, and retrieving web pages. Each task will be repeated at timed intervals. For instance, the client will send 60 emails, one every second.

To select characteristic types of attacker activities, we consider the attack model represented in FIG. 2.

While no single attacker model can perfectly capture the workflow of every attacker, the attack model has been proven to be a useful model for describing the high-level process that most serious attackers will follow. By basing the tasks in our attacker model on the stages of the attack model, the applicant believes that it can obtain reasonable data indicating how effective MTDs are at preventing, deterring, or interrupting attacker behaviors.

It is important to note, however, that MTD defenses are not designed to provide complete security against actions at every stage of the attack model. Instead, different MTD technologies provide varying degrees of protection against actions at each stage.

The attacker model in this example will aim to perform activities from several stages of the attack model, and not necessarily in order. This makes the attacker model less realistic, in some sense, but improves the data that it provides. For instance, if a given MTD is particularly successful at preventing reconnaissance and delivery, it may be very difficult to obtain real-world data about the MTD's effectiveness against later Attack model stages. By including tasks representative of various stages, we can make better assessments of the form "MTD X is good at stopping reconnaissance, but does little against Command and Control," which is more valuable than "MTD X is good at stopping reconnaissance, and we don't know how it handles Command and Control, because no attacker ever made it that far." As such, it will be important to include representative tasks from a variety of the attack model stages, but also to recognize that an MTD's inability to prevent certain types of activities is not necessarily an indictment of its intended effectiveness.

A brief summary of the seven stages in the attack model, particularly as they relate to MTD, follows:

Reconnaissance—This includes information gathering and target identification. Cyber—reconnaissance can incorporate port scanning, traffic interception, and service probing. Reconnaissance provides an attacker with initial situational awareness of the target environment.

Weaponization—Cyber-weapons must often be customized for specific targets. The same payload, for instance, might be packaged differently for different exploitable vulnerabilities. Weaponization is the process of selecting payloads that are compatible with exploitable vulnerabilities observed in the target network and packaging them appropriately.

Delivery—The delivery process is responsible for the actual transmission of the weaponized payload to the targeted environment. Delivery mechanisms could include buffer overflows, social engineering, and direct or indirect access to target systems.

Exploitation—Once a payload has been delivered to a target, the actual exploitation occurs when the payload is executed though some vulnerability. This may be through a software bug that allows code injection, or through coopted legitimate means (e.g., tricking a user into executing a file).

Installation—Simple one-off instances of malware may not be concerned with long term access to compromised systems, but advanced persistent threats will try to use a payload to establish some permanent and reliable access to compromised systems for later use.

Command and Control—A successful installation procedure will result in functional command and control deploying to the compromised systems.

Actions on Targets—With one or more compromised systems, an attacker can perform long-term actions on targets at will. These include, but are certainly not limited to data collection, information exfiltration, propagation, and malicious operations.

These stages are represented, schematically, in FIG. 2.

The Discovery stage information can be collected through the use of a network discovery attack vector such as nmap. Nmap will output the network visibility an attacker has during the course of an attack. The difference between the network visibility of an attacker without an MTD running can be compared to the network visibility when the MTD is running. This comparison will effectively indicate whether an MTD is making it more difficult for an attacker to (accurately) view the network.

The same conceptual theory applies to the remaining stages. The delivery of a payload is the process of getting the attack on to the target system, whether it be through the use of exploitation or even user initiated (e.g., phishing attack) methods. A representative method for remote exploitation is a system with weak credentials in which ncrack can be leveraged to compromise the target system. One would want to know if the use of an MTD will be able to stop this type of attack from occurring.

Attackers want data, making data exfiltration a big concern. A representative data exfiltration tool is ncat (similarly netcat) allowing the attacker to pivot within a network and relay data back to a reachable (Internet or outside connected) system. The ability to stop this attack avenue would be a very valuable feature of an MTD.

Sometimes attackers would like to apply D5 effects (Deceive, Deny, Disrupt, Degrade, and Destroy) to a particular system or network. This capability can be measured with a very simple methodology; the ability to read, write, and execute on the target system. If the introduction of an MTD can reduce or eliminate an attacker's ability to affect a target system with these operations, it is important to capture that information in the metrics.

The ability for an attacker to maneuver within a network means that the security of the infrastructure is only as secure as the weakest (least hardened interconnected) system. The introduction of an MTD technology can hinder or even mitigate that attack avenue.

Metrics process data gathered from multiple runs, where each run represents a combination of a mission, topology, adversary model, and MTD deployment. Some of the runs will have no adversary model and/or no MTD deployed. Runs with no MTD deployed represent a baseline run, which can be contrasted to effects measured during identically configured runs with a deployed MTD technology. This contrast drives the metrics.

The primary metric categories typically measured for MTD are illustrated in the following table.

| Activity Model | Without MTD | With MTD |
|---|---|---|
| Mission Model | mission baseline | cost to mission |
| Attacker Model | attacker baseline | effectivenss |

The metric categories in this table include both the mission and attack models, with and without the MTD deployed. In all cases, values are collected for all four of the attributes defined above (i.e., duration, success, exposure, intactness). By comparing the results for each attribute between the test with the MTD deployed and without the MTD deployed, one can assess the cost of the MTD to mission tasks and the effectiveness of the MTD against attacker tasks. Examining four attributes over two activity models gives eight individual metrics that can be partitioned into two sets of four, or four sets of two, shown in FIG. 5, and described in more detail in the following table.

| Metric | Description |
|---|---|
| Productivity | Mission Productivity can be measured by the rate at which mission tasks are completed |
|  | Attack Productivity is a measure of how quickly an attacker can perform and complete adversarial tasks |
| Success | Mission Success can be measured by the number of attempted mission tasks that are successfully completed |
|  | Attack Success is a measurment of how successful an attacker may be while attempting to attack a network |
| Confidentiality | Mission Confidentiality is a measure of how much mission information is exposed to eavesdroppers, whether information could be intercepted, etc. |
|  | Attack Confidentiality is a measure of how much attacker activity may be visible by detection mechanisms |
| Integrity | Mission Integrity is a measure of how much mission information is transmitted without modification or corruption |
|  | Attack Integrity is a measurement of the accuracy of the information viewed by an attacker |

Productivity is a measure of how quickly tasks in an activity model can be completed. Given an activity model M=<A; T>, where A is the set of task attributes defined herein, above and a valuation v, the productivity of M can defined as the average of the duration attribute over the tasks in M. That is, $$\text{Productivity}(M, v) = \frac{1}{|T|} \sum_{\tau \in T} v(\tau, \text{duration})$$

When M is an instance of the mission model, we can call its productivity mission productivity. Mission productivity is the rate at which mission tasks are completed. The difference between mission productivities of a valuation for a run with the MTD and a valuation without the MTD is the cost of deploying the MTD. Note that it may be possible for the cost to mission productivity of an MTD deployment to be negative in that it is possible that some MTDs decrease the amount of time required to complete mission tasks.

Similarly, when M is an instance of the attacker model, we can call its productivity attacker productivity. Attacker productivity is the rate at which attacker tasks are completed. The difference between attacker productivity for a run with the MTD and a run without the MTD is the effectiveness of the MTD with regard to attacker productivity, or the benefit of deploying the MTD.

We have defined productivity in terms of the duration attribute. While there may be other measures that could also be rightly called productivity, we expect that it is uncontroversial to assume that decreased duration is typically a good result for mission tasks, and that increased duration of attacker tasks is typically a good result from a defensive standpoint. However, we recognize that the arithmetic mean of duration may not be the single best indicator of task time: a single outlier could change the average task time significantly, even though the majority of task durations actually change in the other direction. These types of considerations have led us to make a clean distinction between the data that we collect (that is, the task attributes), and the metrics that we define based on this data. If a flaw should be discovered in a metric definition, or an incremental improvement is proposed, it may not be necessary to rerun tests, but rather only to compute new values from the data. This is an important benefit of certain implementations of the approach outlined herein.

Success is computed similarly to productivity, but using the success attribute rather than duration. The success attribute is Boolean valued, taking on just 0 and 1, but the average over a number of tasks makes mission success and attacker success real-valued numbers in the range [0; 1]. Formally, success is defined as:

$$\text{Success}(M, v) = \frac{1}{|T|} \sum_{\tau \in T} v(\tau, \text{success})$$

As with productivity, the difference between mission success with the MTD and without the MTD represents the cost (in terms of successful completion of tasks) of deploying the MTD. The difference between attacker success with the MTD and without the MTD represents a benefit of deploying the MTD, and the effectiveness of the MTD at thwarting attacker activities.

In some implementations, the focus is simply on the success or failure of all tasks in a mission model. However, in other implementations, by assigning additional attributes to tasks, one can characterize the behavior of MTDs much more specifically. For instance, if a valuation also assigns an attack model phase to each task, then one could identify the phase against which the MTD is most effective.

For instance, let $\Phi=\{$Reconnaissance, Weaponization, . . . $\}$ be the set of attack model phases, phase be the task attribute whose value is an element of $\Phi$, and $T_\phi=\{\tau|v(\tau,\text{phase})=\phi\}$ the set of tasks from the model whose phase is $\Phi$. Then the following is the attack model phase against which the MTD appears to be most effective, when v' is a valuation with the MTD and v a valuation without it.

$$\operatorname*{argmax}_{\phi \in \Phi} \frac{1}{|T_\phi|} \sum_{\tau \in T_\phi} v'(\tau, \text{success}) - v(\tau, \text{success})$$

There are, of course, other measures that could be computed from the same attribute values. For instance, rather than looking at the absolute change in success values, it might be appropriate to look at the proportional change in success values.

Confidentiality is a measure of how much information is exposed by activity model tasks. For the mission model, exposing information is typically undesirable, whereas an attacker being exposed is desirable. Confidentiality is computed similarly to the metrics above, with the same type of costs and benefits derived from them. For a mission model M, we have:

$$\text{Confidentiality}(M, v) = \frac{1}{|T|} \sum_{\tau \in T} v(\tau, \text{unexposed})$$

In principle, there are many ways in which information could be exposed (e.g., being stored in a database in such a way that a web application presents it to users), some of which simply is visible in plaintext in network traffic. An informal hypothesis proposes that some MTDs that are beneficial in ensuring confidentiality of mission information may also help preserve the confidentiality of attacker information, at least if the attacker already has access to compromised hosts and can generate traffic on the network. Testing activities representative of different stages in the attack model may facilitate confirming or refuting this hypothesis.

Integrity is a measure of how much information produced by the activity model tasks is preserved (not corrupted). For the mission model, corrupting information is typically undesirable, though the damage it causes may vary, especially depending on the type information (e.g., digital versus analogue), whereas an attacker's transmissions being corrupted is beneficial and will hinder their attacks. Integrity is computed in the now familiar fashion; we have:

$$\text{Integrity}(M, v) = \frac{1}{|T|} \sum_{\tau \in T} v(\tau, \text{intact})$$

Note that some types of information are much more sensitive to information corruption than others. In encrypted data, even a single bit of corruption may render a transmission useless, but in an analogue audio transmission, static is unpleasant, but may cause no significant loss of functionality. The activity models herein are based on digital information where the amount of corruption can be easily measured, but generally speaking, the measurements herein would be on how much an MTD may corrupt data, not how significant that corruption would be in practice.

The previous sections described a series of metrics designed to measure productivity, success, confidentiality, and integrity from both an attacker and a defender perspective. Each metric is designed to be calculated independently such that overall metrics which blend the potential costs and benefits associated with deploying an MTD can be easily tailored to the needs of an individual customer. In some implementations, these techniques provide a simple weighted average of each metric, where the network mission is positively weighted, and the attacker mission is negatively weighted.

In addition to designing each metric to be separable, all data can be collected in an electronic database which is dynamically linked to the metrics. This may, in some instances, allow leveraging the metrics to answer questions developed after the experiments. For example, if one wanted to determine if the effectiveness of an MTD was dependent on network policy, one could rerun metrics on the data with different network policies and measure the effects.

What follows is a description of an exemplary, prophetic analysis of the effectiveness of two MTDs. Generally speaking, this can be done by running a series of tests to collect data for these MTDs under normal operating conditions and under attack conditions in a network. Analysis of the data collected from MTD evaluation experiments including extracting results from data regarding the overhead of MTD deployment and the effectiveness of MTDs against adversarial actions will be used to characterize MTD effectiveness. The resulting metrics will convey a comprehensive characterization of effects/limitations of selected agility mechanisms against threats (such as APTs).

FIG. 8 outlines the MTD effectiveness characterization process implemented within a cyber quantification framework.

Metrics for effectiveness of moving target defenses are based on performing sets of tasks on networks with and without moving target defenses deployed. These metrics are broken down into two categories; mission metrics and attack metrics, as shown, for example, in FIG. 5 and FIG. 7. The mission metrics assess the MTDs impact on the underlying mission network and the ability to continue operations. The attack metrics assess the MTDs ability to hinder attackers.

This example does not include directly instrumenting measurements such as increased attack surface created by the MTD, however, these can be reflected indirectly in metrics such "Attack Productivity" (since there will be more nodes against which an attack can be launched, and more nodes that could be used as pivots) and "Mission Confidentiality" (since Attacker Reconnaissance may be more successful with more nodes on the network).

Calculation of these metrics and the intent of each metric presented in FIG. 6, are described elsewhere herein in more detail. Here, however, we quickly describe a few other metrics that are relevant to MTD performance and effectiveness, but which are not the primary focused of this effort.

This experimental design is primarily focused on task set-oriented metrics, but some other metrics may be of importance for quantifying MTD effectiveness. In particular, an MTD may provide additional functionality for Attack Confidentiality and attribution. Additionally, the compatibility of an MTD with various cyber-environments and network topologies can be a critical consideration in determining whether an MTD can be deployed in support of a given mission.

The test networks can be run in a virtualized environment, and instrumentation on the testbed makes it easy to monitor the overall CPU, disk, network, and hardware usage with and without the MTDs. These measurements may not be associated with any particular tasks, but the comparison on networks with and without deployed MTDs can provide a good measure of the general resource requirements of an MTD, as well as provide data to evaluate whether other measures (e.g., mission productivity) are affected by the resources available to an MTD. The same type of instrumentation can be used to evaluate overall availability of network resources by recording, for example, uptime rates across nodes in the network.

In some implementations, an "Adversary Interpretation" of the "percentage of tasks not exposed" metric provides some measurement of how well standard detection and intrusion might perform in environments where MTDs have been deployed. However, some MTDs may have additional tools for monitoring traffic on their networks, reporting traffic that does not adhere to MTD policies, or for intercepting disallowed traffic. Such capabilities are obviously specific to MTDs, but may have some common features. A useful quantification of MTD capabilities for Attack Confidentiality and attribution may include, then, a survey and comparison of features supported by MTDs. Such a survey can be designed (and updated) as more MTDs are examined.

Some features include:
Ability to detect traffic outside of approved policy
Ability to record log traffic outside of approved policy
Ability to redirect disallowed traffic to honeypot systems In this effort, we will not attempt to automatically determine the platforms on which an MTD can be deployed. However, knowledge of the systems with which an MTD is compatible can be important in the process of assessing the applicability and effectiveness of an MTD; an MTD that cannot be deployed on a network cannot be effective on that network. This information can be collected, for example, from manuals and documentation of the MTDs to be assessed, and this can be stored (e.g., in an electronic database) with test results to be used in later analysis and compatibility assessment.

The mission metrics and attack metrics referred to above are based on the assumption that within a given operational network, tasks are continually performed. These tasks may be mission-oriented or adversarial in nature (and each of these categories can be subdivided further). Each individual task has a number of attributes, some of which are observable, and these may include, for example:
How long is the task's duration?
Does the task complete successfully?
Is the task's "internal data" visible to observers?
Is the task's "internal data" corrupted during the task's lifetime?
For a given task i, we denote these attributes, respectively, as:
taskDuration,
taskCompleted
taskExposed
taskCorrupted During some period of observation of a network, there will be some number of attempted tasks, some of which can be categorized as mission tasks, and some of which can be categorized as adversarial tasks. We call the number of each type of task, respectively:
numMissionTasks
numAdversarialTasks The mission metrics and attack metrics identified above can now be defined as weighted averages of task attribute values over the different types of tasks. In some instances, weights will not be used much, but, in other instances, when incorporating a weighting in the definitions it will be easier later to support inquiries of the type "which MTD is most effective at protecting the confidentiality of one particular type of mission task?"

In each of the following definitions, we presume that the tasks whose attributes are averaged are drawn from either the set of observed mission tasks or adversarial tasks, but not both. For instance $E_{i=1}^{numMissionTasks}$ taskDuration$_i$ is the average duration of mission tasks.

The questions of "how many tasks are there?" and "how are task attributes observed?" are experimental in nature. In a live setting, sensors can be deployed to both detect tasks and observe the attributes. In the experimental setting of the present effort, the number of tasks can be fixed for an experiment, and custom sensors are deployed to observe their attributes. The experimental setup is described later in further detail later.

Mission Productivity can be measured by the rate at which mission tasks are completed. This depends on the average time between tasks and the dependencies among tasks, as well as the amount of time required to complete a task. Lower duration values are better. The average length of a successfully completed task can be expressed as:

Mission Productivity $$missionProductivity = \sum_{i=1}^{numMissionTasks} \frac{w_i \times taskDuration_i}{numMissionTasks}$$

where:
numMissionTasks is the number of mission tasks
taskDuration is the time it takes to complete the mission task in seconds.

Attack Productivity is a measure of how quickly an attacker can perform and complete adversarial tasks. Higher duration values are better. The average length of successfully completed task can be expressed as.

Attack Productivity $$attackProductivity = \sum_{i=1}^{numAdversarialTasks} \frac{w_i \times taskDuration_i}{numAdversarialTasks}$$

where:
numAdversarialTasks is the number of total adversarial tasks
taskDuration is the time it takes to complete the adversarial task in seconds.

Mission Success can be measured by the percentage of attempted tasks that are successfully completed. In conjunction with mission-specific knowledge about how many times tasks can be reattempted can be used to predict how reliably a mission will progress. Higher completion values are better. The percent of attempted tasks successfully completed can be expressed as:

Mission Success

-continued $$missionSuccess = \sum_{i=1}^{numMissionTasks} \frac{w_i \times taskCompleted_i}{numMissionTasks}$$

where:
numMissionTasks is the number of total mission tasks
taskCompleted is a binary value for whether the task completed.

Attack Success is a measurement of how successful an attacker may be while attempting to attack a network. Lower completion values are better. The percent of attempted tasks successfully completed can be expressed as:

Attack Success $$attackSuccess = \sum_{i=1}^{numAdversarialTasks} \frac{w_i \times taskCompleted_i}{numAdversarialTasks}$$

where:
numAdversarialTasks is the number of total adversarial tasks
taskCompleted is a binary value for whether the task completed.

Mission Confidentiality is a measure of how much information is exposed to eavesdroppers, whether information could be intercepted, etc. While the importance of mission confidentiality depends on the specific mission, lower exposure values are better. The percent of attempted tasks in which task information was exposed can be expressed as:

Mission Confidentiality $$missionConfidentiality = \sum_{i=1}^{numMissionTasks} \frac{w_i \times taskExposed_i}{numMissionTasks}$$

where:
numMissionTasks is the number of total mission tasks
taskExposed is whether the mission data is exposed.

Attack Confidentiality is a measure of how much attacker activity may be visible to detection mechanisms. Higher exposure values are better. The percent of attempted tasks in which task information was exposed can be expressed as:

Attack Confidentiality $$attackConfidentiality = \sum_{i=1}^{numAdversarialTasks} \frac{w_i \times taskExposed_i}{numAdversarialTasks}$$

where:
numAdversarialTasks is the number of total adversarial tasks
taskExposed is whether the attack is exposed.

Mission Integrity is a measure of how much mission information is transmitted without modification or corruption. The importance of uncorrupted data depends on the nature of the data, but lower corruption values are better. The percent of attempted tasks in which task information was corrupted can be expressed as:

Mission Integrity $$missionIntegrity = \sum_{i=1}^{numMissionTasks} \frac{w_i \times taskCorrupted_i}{numMissionTasks}$$

where:
numMissionTasks is the number of total mission tasks
taskCorrupted is whether the mission data was altered.

Attack Integrity is a measurement of the accuracy the information viewed by an attacker. Confusion may be an important step in a counterattack. Higher corruption values are better. The percent of attempted tasks in which task information was corrupted can be expressed as:

Attack Integrity $$attackIntegrity = \sum_{i=1}^{numAdversarialTasks} \frac{w_i \times taskCorrupted_i}{numAdversarialTasks}$$

where:
numAdversarialTasks is the number of total adversarial tasks
taskCorrupted is whether the attack data was altered.

In order to develop a realistic set of adversarial tasks, and in order to sub-categorize adversarial tasks in a manner to better characterize MTD effectiveness against them, a model can be adopted. In one example, a specific model of Advanced Persistent Threat (APT) behavior is adopted, such as a threat model based on the attack model, which, again, includes seven stages.

MTD defenses are not designed to provide complete security against actions at every stage of the attack model. Instead, different MTD technologies provide varying degrees of protection against actions at each stage. A suite of adversarial tasks, shown in the APT example of FIG. 3 is designed to capture common adversarial tasks at different stages of the attack model. By categorizing adversarial tasks according to attack model stages, it is possible to characterize the defensive benefits of different MTDs against different stages of attacks.

Figure 10:
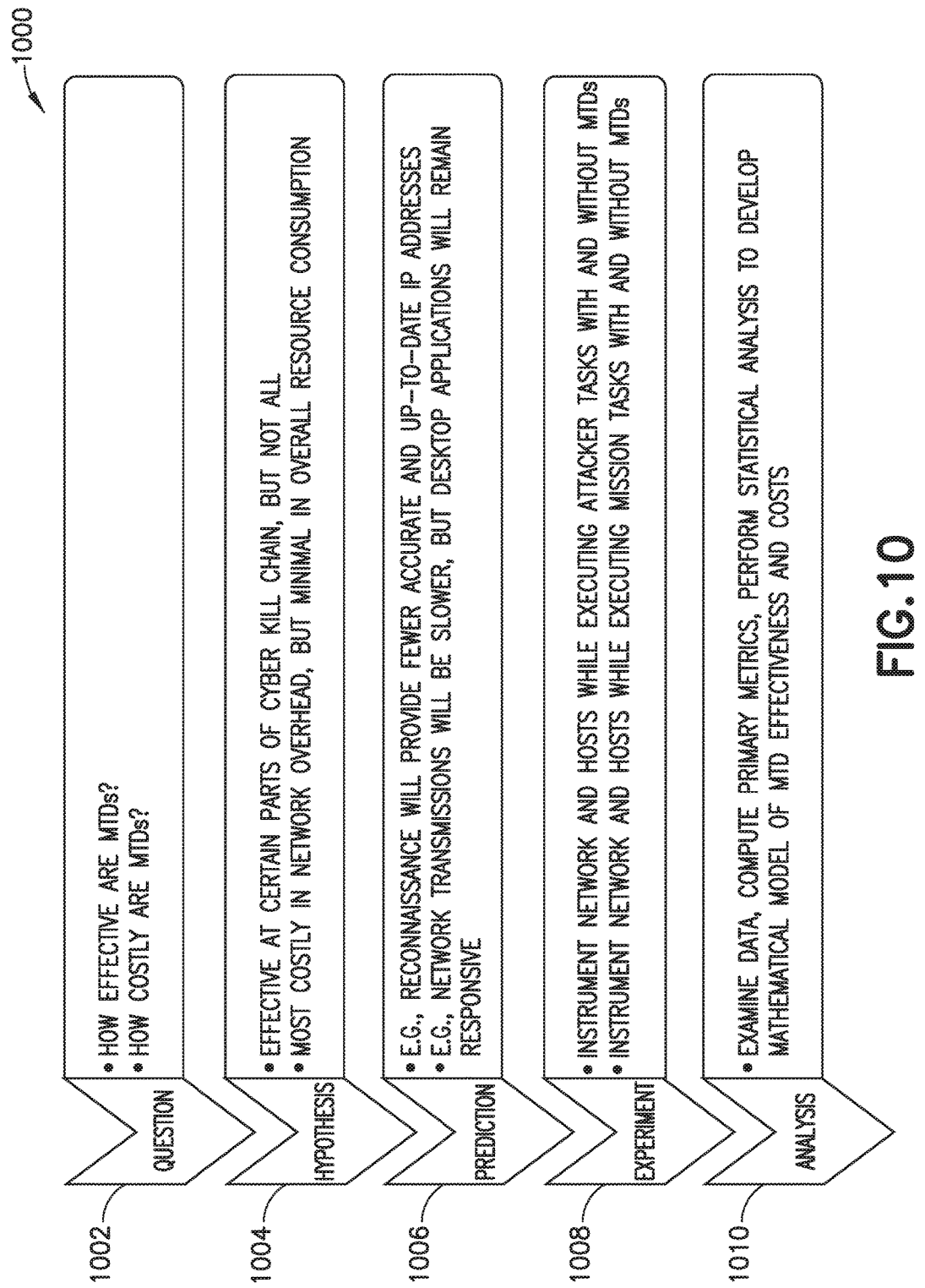
FIG. 10 represents an exemplary quantitative framework for a Moving Target Defense (MTD) effectiveness evaluation.

FIG. 10 represents a quantitative framework for an MTD effectiveness evaluation 1000. In some implementations, the method represented by the illustrated framework can be used to answer (and provide reusable methods for answering) the questions of how effective MTDs are protecting a mission against attacker actions and how costly are MTDs to mission performance.

As shown, the illustrated framework includes questions 1002, hypotheses 1004, predictions 1006, experiments 1008 and analyses 1010. The exemplary questions 1002 include: "How effective are MTDs?" and "How costly are MTDs?" The exemplary hypotheses 1004 include: "effective at certain parts of the attack model, but not all." and "Most costly in network overhead, but minimal in overall resource consumption." The exemplary predictions 1006 include: "e.g., reconnaissance will provide fewer accurate and up-to-date IP addresses." and "e.g., network transmissions will be slower, but desktop applications will remain responsive." The exemplary experiments 1008 include "Instrument network and hosts while executing attacker tasks with and without MTDs." and "Instrument network and hosts while executing mission tasks with and without MTDs." The exemplary analysis 1010 includes "Examine data, compute primary metrics, perform statistical analysis to develop mathematical model of MTD effectiveness and costs."

Generally speaking, MTDs, having been designed with these purposes in mind, will be more or less successful. The focus, in this example, is on particular stages of attack model (described herein). For instance, if an MTD is effective at mitigating reconnaissance tasks, then attacker tools for reconnaissance tasks should produce fewer accurate and informative results. Using a particular experimentation server, one can instrument network traffic and hosts in simulated mission environments, collecting data from mission activity applications and servers, attacker tools, and an environment virtualization server. Finally, the method includes analyzing the data, computing values of primary metrics, and using statistical analysis and regression to formulate a mathematical model of MTD effectiveness and cost.

A series of tests can be conducted to assess the MTD technologies. In general, a test suite is defined by:
  A collection of task sets
    Each task set includes a number of mission tasks
      Representing components of realistic mission activities
    Each task set includes a number of adversarial tasks
      Representing components of realistic advanced persistent threat (APTs) attacks
    Each task includes a mechanism for executing the task and collecting four measurements
      Length of time to complete the task execution
      Whether the task was successfully completed
      Whether task information was exposed
      Whether task information was corrupted
  A collection of network topologies (in this effort: small, medium, large); and
  A collection of MTDs.
  For each MTD, each network topology, and each task set:
    Run the task set on the network topology without the MTD installed, collect measurements
    Run the task set on the network topology with the MTD installed, collect measurements Each task set will be designed such that the differences in measurements with and without the MTDs for the task set characterize some higher-level measurement (e.g., cost, benefit) of the MTD. In particular, in this effort, a "mission activity" task set and an "adversary activity" task set are used. The differences in measurements for the "adversary activity" task set characterize the defensive benefit of the MTD. The differences in measurements for the "mission activity" task set characterize the performance costs of the MTD on a mission. Additional attributes on tasks make it possible to analyze high-level attributes in greater detail (e.g., MTD performance costs for a specific type of mission task).

A variety of virtual machine configurations can be used for this experiment.

Figure 11:
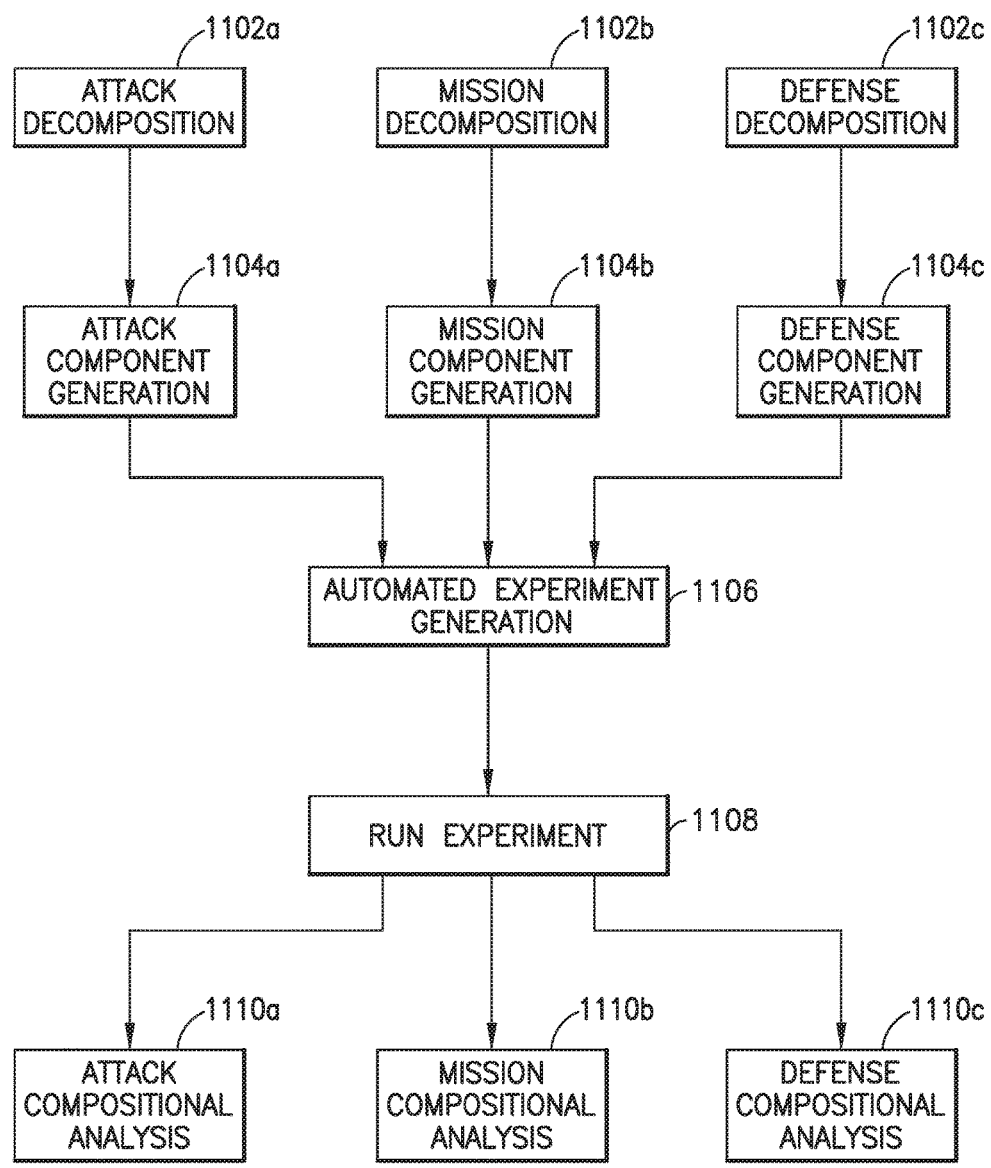
FIG. 11 is a flowchart of a process that can facilitate, among other things, drawing conclusions about future attack/mission/defense interactions in a network.

FIG. 11 is a flowchart of a process that can facilitate, among other things, drawing conclusions about future attack/mission/defense interactions in a network.

The illustrated process includes decomposing one or more attack 1102*a*, decomposing one or more missions 1102*b* and/or decomposing one or more defenses 1102*c* into atomic elements. The process shows generating one or more attack components 1104*a*, one or more mission components 1104*b*, and/or one or more defense components. Next, the process includes automatically generating 1106 (e.g., with a computer system having one or more processors, for example) an experiment (or series of experiments) and running 1108 the one or more experiments to gather statistical evidence of the interaction between these elements. Next, the process includes performing a compositional analysis of the one or more attacks 1110*a*, performing a compositional analysis of the one or more missions 1110*b*, and/or performing a compositional analysis of the one or more defenses 1110*a*. Through this process, conclusions can be drawn about complex attack/mission/defense interactions in the future that are composed of these atomic attack/mission/defense elements.

Figure 12:
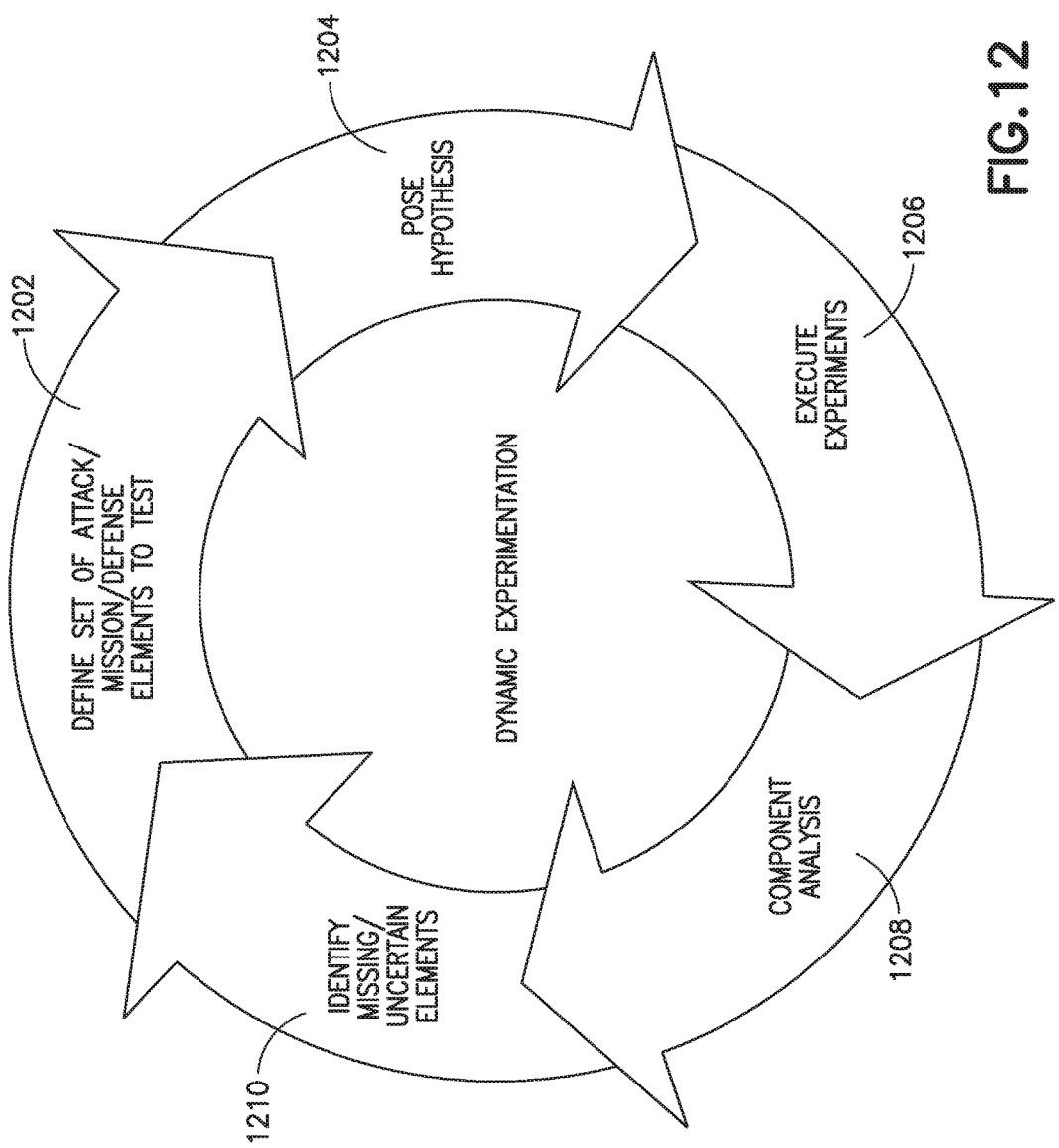
FIG. 12 is a schematic representation of an exemplary iterative dynamic experimentation process.

FIG. 12 depicts an iterative process performed around the compositional analysis mentioned above with respect to FIG. 11.

According to the illustrated embodiment, the iterative process includes defining (at 1202) a set of attack, mission, and/or defense elements to test, posing (at 1204) one or more hypotheses about the defined set of attack, mission, and/or defense elements, executing experiments (at 1206) based on the one or more hypotheses, performing (at 1208) component analyses based on results of the experiments, and identifying (at 1210) missing or uncertain elements. The illustrated compositional analysis process is effective in the face of missing or uncertain attack/mission/defense information through statistical inference enabling quantification.

Figure 13:
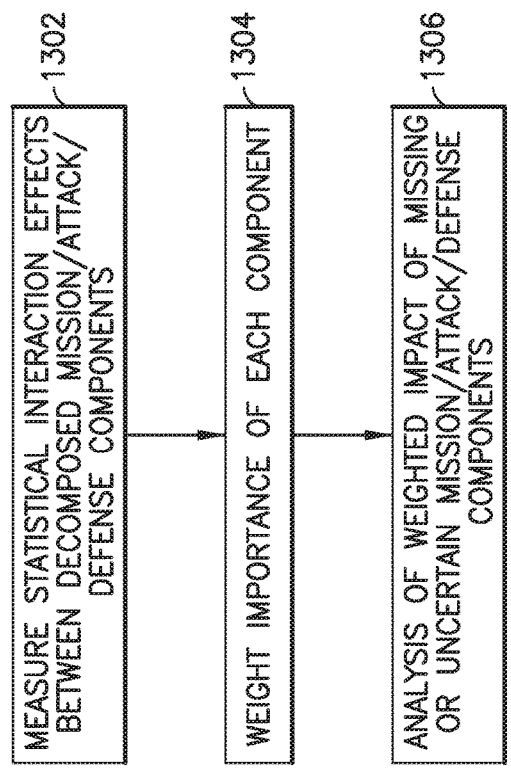
FIG. 13 is a flowchart of an exemplary dynamic experimentation process.

FIG. 13 is a flowchart of a dynamic experimentation procedure. The approach supports dynamic experiments where an initial experiment containing a set of atomic attack elements can be iteratively refined to reduce/eliminate uncertainty in order to answer hypothesized queries with predefined statistical significance.

The process includes measuring (at 1302) statistical interaction effects between decomposed mission/attack/defense components. Next, the process includes weighing (at 1304) an importance of each. Finally, the process includes analyzing (at 1306) a weighed impact of missing or uncertain mission/attack/defense components.

In a typical implementation, the process represented in FIG. 13 would include run multiple tests and collecting data from those tests. Each test will have a number of attributes. For instance, one test might use virtual machines with one CPU speed, and another test will use virtual machines with another CPU speed. In general, mission settings, attack settings, and defensive technology settings are varied. Each test run has some evaluated quantities as well (e.g., test run A scores 73, whereas test run B scores 34). In this example, "measuring statistical interaction effects between decomposed mission/attack/defense components," and "weight importance of each component," means determining which mission, attack, and defensive technology settings (and combinations of them) correlate with what evaluated quantities. E.g., "score is more sensitive to CPU speed than to mission setting X." Then, in this example, "analysis of weighted impact of missing or uncertain mission/attack/defense components," means, given a mission/attack/defense specification, perhaps with some missing details, it still is possible to make a prediction about the evaluated quantities it would produce, and which missing details would improve the prediction the most.

Figure 14:
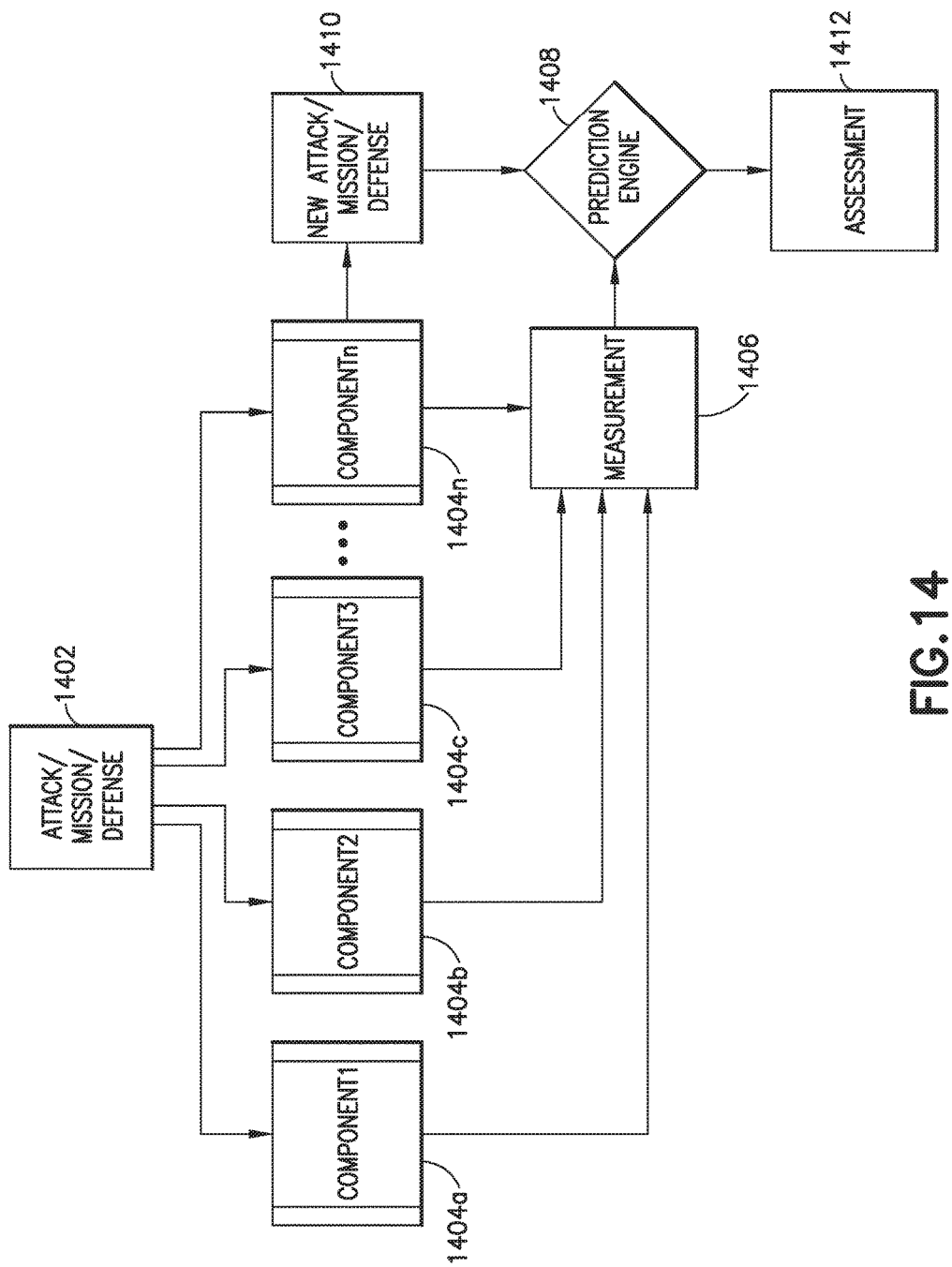
FIG. 14 is a schematic breakdown of an exemplary componentization and prediction process.

FIG. 14 is a schematic breakdown of an exemplary componentization and prediction process.

According to the illustrated breakdown, one or more attacks and/or missions and/or defenses 1402 are broken down into components (phases) 1404*a*, 1404*b*, 1404*c*, . . . , 1404*n*, and then measured (at 1406).

The component measurements are fed into a computer-implemented prediction engine 1408 where new (possibly partial) attack, mission and defense sets 1410 can be assessed 1412. The assessment of the new attack, mission and defense sets 1410 by the computer-implemented prediction engine 1408 can be done in a number of ways, but is generally based, for example, on similarities previously measured (analyzed) attack, mission and defense sets that may be similar in one or more ways to the new attack, mission and defense set 1410 under consideration.

In a typical implementation, at least some of the processes described herein are performed on or with the assistance of a computer—either on its own or in a computer network environment. These processes may include, for example, facilitating and supporting the generation of a virtual model of either an existing computer network, against which testing is to be performed, or a computer network being planned. These processes may include, for example, mimicking behavior of actual network components in the virtual model. These processes may include, for example, running virtual tests on the virtual models and comparing results of different tests. These processes may include calculating various metrics. The processes may include functionalities associated with the prediction engine described herein. These processes may include, for example, storing various information (e.g., in an electronic database), such as information about the virtual model and/or a network to be tested or being tested, test results, comparison results, metrics, other information entered by users, etc.

As just mentioned, the computer may facilitate or perform functionalities associated with the prediction engine described herein. In a typical implementation, this computer-based predicting engine may predict effectiveness of a cybersecurity technology in an untested network based on data saved in the computer-based database about another test. Moreover, the computer-based prediction engine may use machine learning based on data in the electronic database (e.g., about tests, calculations, etc.) to improve prediction capabilities as more data is added to the computer-based (electronic) database.

Figure 15:
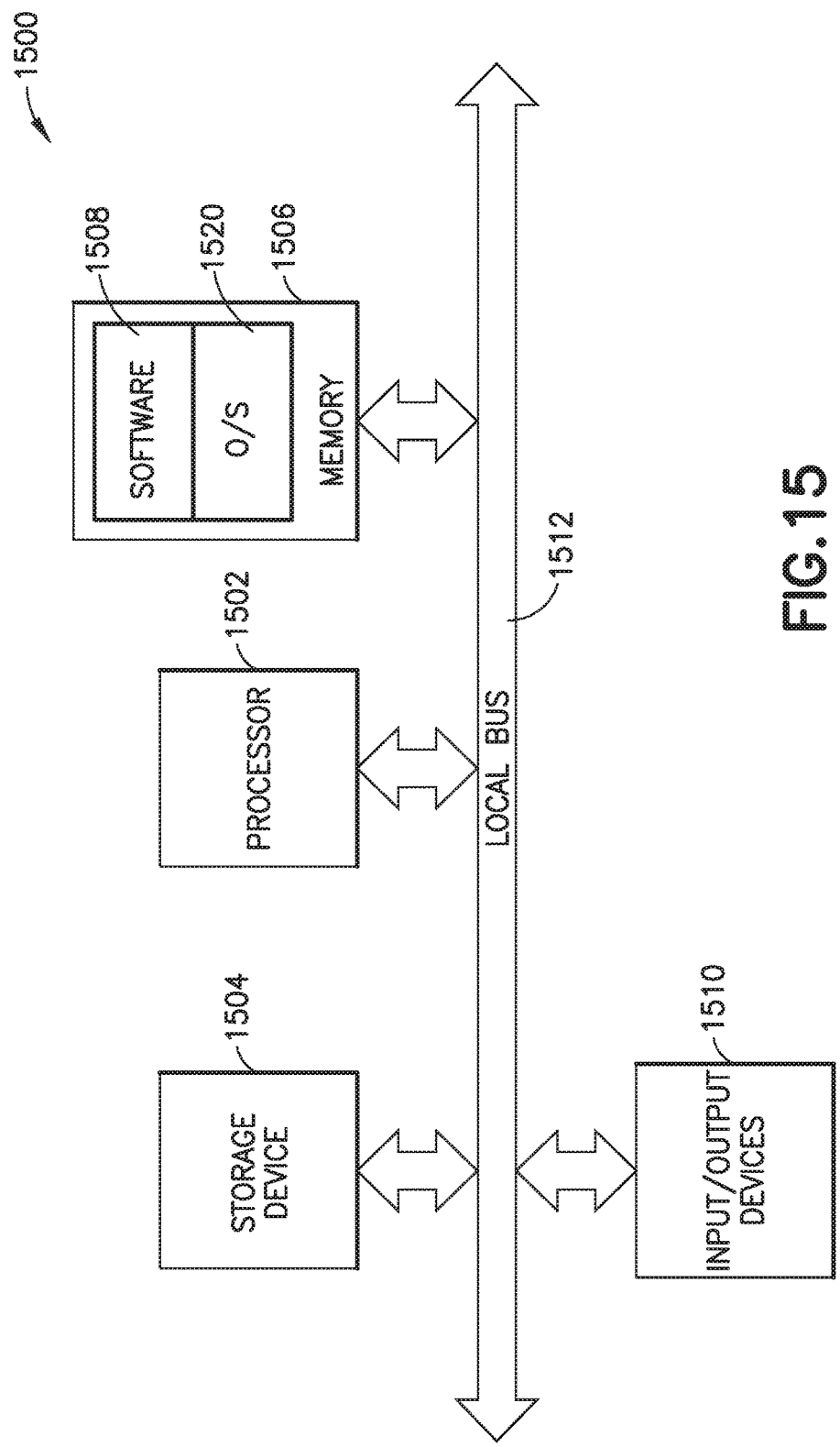
FIG. 15 is a schematic representation of a computer that may perform and/or be used to facilitate various functionalities disclosed herein.

An example of this kind of computer 1500 is shown in FIG. 15.

The illustrated computer 1500 has a computer-based processor 1502, a computer-based storage device 1504, a computer-based memory 1506, with software 1508 stored therein that, when executed by the processor 1502, causes the processor to provide functionality to support system 1500 operations as described herein, input and output (I/O) devices 1510 (or other peripherals), and a local communications interface 1512 that allows for internal communication within the computer 1500. The local interface 1512 can be, for example, one or more buses or other wired or wireless connections. In various implementations, the computer 1500 may have additional elements, such as controllers, buffers (caches), drivers, repeaters, and receivers, to facilitate communications and other functionalities. Further, the local interface 1512 may include address, control, and/or data connections to enable appropriate communications among the illustrated components.

The processor 1502, in the illustrated example, is a hardware device for executing software, particularly that stored in the memory 1506. The processor 1502 can be any custom made or commercially available single core or multi-core processor, a central processing unit (CPU), an auxiliary processor among several processors, a semiconductor based microprocessor (in the form of a microchip or chip set), a macroprocessor, or generally any device for executing software instructions. In addition or instead, the processing function can reside in a cloud-based service accessed over the internet.

The memory 1506 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 1506 may incorporate electronic, magnetic, optical, and/or other types of storage media. The memory 1506 can have a distributed architecture, with various memory components being situated remotely from one another, but accessible by the processor 1502.

The software 1508 includes one or more computer programs, each of which contains an ordered listing of executable instructions for implementing logical functions associated with the computer 1506, e.g., to perform or facilitate one or more of the functions described herein. The memory 1506 may contain an operating system (O/S) 1520 that controls the execution of one or more programs within the computer, including scheduling, input-output control, file and data management, memory management, communication control and related services and functionality.

The I/O devices 1510 may include one or more of any type of input or output device. Examples include a keyboard, mouse, scanner, microphone, printer, display, etc. In some implementations, a person having administrative privileges, for example, may access the computer-based processing device to perform administrative functions through one or more of the I/O devices 1510.

In a typical implementation, the computer 1500 also includes a network interface (not shown) that facilitates communication with one or more external components via a communications network (e.g., the Internet). The network interface can be virtually any kind of computer-based interface device. In some instances, for example, the network interface may include one or more modulator/demodulators (i.e., modems); for accessing another device, system, or network), a radio frequency (RF) or other transceiver, a telephonic interface, a bridge, a router, or other device. During system operation, the computer receives data and sends notifications and other data via the network interface.

A number of embodiments of the invention have been described. Nevertheless, it will he understood that various modifications may be made without departing from the spirit and scope of the invention.

For example, some of the exemplary techniques disclosed herein focused on assessing MTDs. However, the techniques disclosed herein are applicable, of course, much more broadly (e.g., to assessing the effectiveness of virtually any other types of cybersecurity technologies in virtually any kind of existing or contemplated network environment).

Testing is described herein as being directed to specific component stages in the attack model, for example. Of course, the testing can be performed on any one or more of these specific stages and in any order. For example, in some instances, at least one of the tests may be conducted on a downstream one of the component stages of the attack model at the computer network element, without also testing one or more upstream component stages of the attack model at the computer network element.

The testing can be performed in a virtual, computer-generated network environment, or in a real world, actual network environment. In a virtual setting, the computer network may be a computer-implemented virtual model of an actual or planned computer network and the testing is performed in the virtual environment that includes the virtual model of the computer network. In a typical implementation of this sort, the testing can be performed at multiple (or all of the) component stages of the attack model at different points in a network simultaneously (or without significant delay). In a real world setting, the computer network is a real world computer network, and the testing can include actually instrumenting one or more points in the network.

In some implementations, for each respective one of the tested component stages, multiple different types of tasks are considered that might lead to an undesirable compromise of network security. Moreover, in a typical implementation, for each respective one of the tested component stages in a given test, information is provided that is relevant to effectiveness of the first cybersecurity technology, in terms of one or more of the following: detection, mitigation and effect on network overhead.

While this specification contains many specific implementation details, these should not be construed as limitations on the scope of any inventions or of what may be indicated in the numbered paragraphs near the end of this disclosure, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described in the numbered paragraphs near the end of this disclosure as such, one or more features from such a combination can in some cases be excised from the combination, and the combination may be directed to a subcombination or variation of a subcombination.

Similarly, while operations are described herein and/or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. A method for assessing effectiveness of one or more cybersecurity technologies in a computer network, the method comprising:
generating two or more component stages of an attack model based on decomposing one or more attacks;
separately testing each of the two or more component stages at a first computer network element twice,
wherein a first one of the tests is conducted with a first one of the cybersecurity technologies operable to protect the first computer network element,
wherein a second one of the tests is conducted with the first cybersecurity technology not operable to protect the first computer network element, and
wherein the two tests include generating results based on measuring a cost and a benefit associated with operating the first one of the cybersecurity technologies; and
characterizing the effectiveness of the first cybersecurity technology for each one of the twice-tested component stages, based on comparing results from the first test and the second test.

2. The method of claim 1, wherein the component stages of the attack model are selected from the group consisting of reconnaissance, weaponization, delivery, exploitation, installation, command and control, and action on target.

3. The method of claim 1, wherein testing the two or more component stages of the attack model at the computer network element twice, comprises testing all of the component stages of the attack model at the computer network element twice, wherein the component stages of the attack model include reconnaissance, weaponization, delivery, exploitation, installation, command and control, and action on target.

4. The method of claim 1, further comprising:
subsequently testing each of the two or more component stages of the attack model at the first computer network element twice,
wherein a first one of the subsequent tests is conducted with a second one of the cybersecurity technologies operable to protect the first computer network element, and
wherein a second one of the subsequent tests is conducted with the second cybersecurity technology not operable to protect the first computer network element; and
for each one of the subsequently twice-tested component stages, comparing results from the first and second subsequent tests,
wherein the comparison yields or leads to information helpful in assessing effectiveness of the second cybersecurity technology on each respective one of the subsequently twice-tested component stages at the computer network element.

5. The method of claim 4, further comprising:
comparing results of the testing that involved the first cybersecurity technology to the results of the testing that involved the second cybersecurity technology,
wherein comparing the results yields or leads to information helpful in assessing effectiveness of the first cybersecurity system relative to the second cybersecurity technology.

6. The method of claim 1, wherein the testing includes measuring one or more of mission productivity, attack productivity, mission success, attack success, mission confidentiality, attack confidentiality, mission integrity and attack integrity.

7. The method of claim 6, wherein:
the mission productivity relates to a rate at which mission tasks are complete,
the attack productivity relates to a rate at which mission tasks are complete,
the mission success relates to an amount of attempted mission tasks that are successfully completed,
the attack success relates to how successful an attacker may be while attempting to attack the computer network,
the mission confidentiality relates to how much mission information is exposed to the attacker or can be intercepted,
the attack confidentiality relates to how much attacker activity may be visible to detection mechanisms,
the mission integrity relates to how much mission information is transmitted without modification or corruption, and the attack integrity relates to accuracy of information viewed by the attacker.

8. The method of claim 1, wherein the testing comprises:
measuring statistical interaction effects between decomposed mission, attack and/or defense components;
weighing importance of each effect; and
analyzing weighted importance of missing or uncertain mission, attack and/or defense components.

9. The method of claim 1, wherein the computer network is a computer-implemented virtual model of an actual or planned computer network and the testing is performed in a virtual environment that includes the virtual model of the computer network.

10. The method of claim 9, further comprising: performing the testing at a plurality of component stages of the attack model at a plurality of different computer network elements simultaneously.

11. The method of claim 1, wherein the computer network is a real world computer network, and wherein the testing comprises instrumenting one or more points in the network.

12. The method of claim 1, further comprising, for each respective one of the tested component stages, considering a plurality of different typical tasks that might lead to an undesirable compromise of network security.

13. The method of claim 1, further comprising, for each respective one of the tested component stages, providing information relevant to effectiveness of the first cybersecurity technology, in terms of one or more of the following: detection, mitigation and effect on network overhead.

14. The method of claim 1, further comprising:
saving data from each testing performed in computer-based database;
predicting, with a computer-based prediction engine, effectiveness of the first, or another, cybersecurity technology in an untested network based on the data saved in the computer-based database.

15. The method of claim 14, further comprising: using machine learning at the computer-based prediction engine based on data in the computer-based database to improve prediction capabilities as more data is added to the computer-based database.

16. The method of claim 1, wherein at least one of the tests is conducted on a downstream one of the component stages of the attack model at the computer network element, without also testing one or more upstream component stages of the attack model at the computer network element.

17. A method comprising:
defining a set of attack, mission, and defense elements at a computer network element to test;
posing one or more hypotheses regarding one or more of the defined attack, mission, and defense elements;
generating two or more component stages of an attack model based on decomposing one or more attacks;
executing testing of the one or more hypotheses, wherein executing the testing comprises:
testing each of the two or more component stages a first computer network element twice,
wherein a first one of the tests is conducted with a first one of the defensive cybersecurity technologies operable to protect the first computer network element,
wherein a second one of the tests is conducted with the first defensive cybersecurity technology not operable to protect the first computer network element, and
wherein the two tests include generating results based on measuring a cost and a benefit associated with operating the first one of the defensive cybersecurity technologies; and
analyzing the first computer network element,
wherein analyzing the first computer network element comprises characterizing an effectiveness of the first one of the defensive cybersecurity technologies for each one of the twice-tested component stages based on comparing the results from the first test and the second test; and
identifying one or more missing or uncertain elements.

18. The method of claim 17, wherein the component stages of the attack model are selected from the group consisting of reconnaissance, weaponization, delivery, exploitation, installation, command and control, and action on target.

19. A system comprising:
a computer-based processor and
a computer-based memory coupled to the computer-based processor and having stored thereon instructions executable by the computer-based processor to cause the computer-based processor to facilitate assessing effectiveness of one or more defensive cybersecurity technologies in a computer network,
wherein assessing effectiveness comprises:
generating two or more component stages of an attack model based on decomposing one or more attacks;
testing each of the two or more component stages of an attack model at a first computer network element twice,
wherein a first one of the tests is conducted with a first one of the defensive cybersecurity technologies operable to protect the first computer network element,
wherein a second one of the tests is conducted with the first defensive cybersecurity technology not operable to protect the first computer network and
wherein the two tests include generating results based on measuring a cost and a benefit associated with operating the first defensive cybersecurity technology; and
for each one of the twice-tested component stages, characterizing with the computer-based processor, an effectiveness of the first one of the defensive cybersecurity technologies based on comparing the results from the first test and the second test.

20. The system of claim 19, wherein the component stages of the attack model are selected from the group consisting of reconnaissance, weaponization, delivery, exploitation, installation, command and control, and action on target.

* * * * *